(12) United States Patent
Noh et al.

(10) Patent No.: US 12,055,841 B2
(45) Date of Patent: Aug. 6, 2024

(54) CAMERA DEVICE

(71) Applicant: LG INNOTEK CO., LTD., Seoul (KR)

(72) Inventors: Yun Ho Noh, Seoul (KR); Hyun Soo Kim, Seoul (KR); Kap Jin Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 551 days.

(21) Appl. No.: 17/413,278

(22) PCT Filed: Dec. 27, 2019

(86) PCT No.: PCT/KR2019/018619
§ 371 (c)(1),
(2) Date: Jun. 11, 2021

(87) PCT Pub. No.: WO2020/139028
PCT Pub. Date: Jul. 2, 2020

(65) Prior Publication Data
US 2022/0019132 A1 Jan. 20, 2022

(30) Foreign Application Priority Data

Dec. 28, 2018 (KR) .................. 10-2018-0172578
Dec. 28, 2018 (KR) .................. 10-2018-0172579
Dec. 28, 2018 (KR) .................. 10-2018-0172580

(51) Int. Cl.
*G03B 17/12* (2021.01)
*G02B 3/12* (2006.01)

(52) U.S. Cl.
CPC .............. *G03B 17/12* (2013.01); *G02B 3/12* (2013.01)

(58) Field of Classification Search
CPC .......... G03B 17/12; G03B 30/00; G02B 3/12; G02B 7/08; G02B 7/02; G02B 27/646; H04N 23/55
USPC ........................................... 359/665
See application file for complete search history.

(56) References Cited

U.S. PATENT DOCUMENTS

| | | | |
|---|---|---|---|
| 9,880,327 B2 | 1/2018 | Park et al. | |
| 10,054,840 B2* | 8/2018 | Ha | H04N 23/57 |
| 10,921,545 B2* | 2/2021 | Jeong | G02B 7/08 |
| 11,269,116 B2* | 3/2022 | Choi | H04N 23/6812 |
| 2008/0037973 A1 | 2/2008 | Jung | |
| 2013/0070249 A1 | 3/2013 | Choi et al. | |
| 2015/0048531 A1 | 2/2015 | Annen et al. | |

(Continued)

FOREIGN PATENT DOCUMENTS

| | | |
|---|---|---|
| CN | 102972018 A | 3/2013 |
| CN | 203444154 U | 2/2014 |

(Continued)

*Primary Examiner* — William R Alexander
(74) *Attorney, Agent, or Firm* — Birch, Stewart, Kolasch & Birch, LLP

(57) ABSTRACT

The present exemplary embodiment relates to a camera module comprising: a substrate; an image sensor disposed on the substrate; a base disposed on the substrate; a lens holder disposed on the base; a lens module disposed in the lens holder; a liquid lens module coupled to the lens module; and an adhesive for coupling the lens holder and the base, wherein the lens holder comprises a groove formed between the base and the liquid lens module.

20 Claims, 27 Drawing Sheets

(56) References Cited

U.S. PATENT DOCUMENTS

| | | | |
|---|---|---|---|
| 2015/0296110 A1* | 10/2015 | Lee | H04M 1/0264 |
| | | | 348/294 |
| 2017/0038661 A1* | 2/2017 | Ha | G03B 13/36 |
| 2017/0099420 A1* | 4/2017 | Lee | G03B 17/08 |
| 2017/0315274 A1 | 11/2017 | Park et al. | |
| 2018/0321572 A1* | 11/2018 | Ha | G02F 1/29 |
| 2019/0033553 A1* | 1/2019 | Jeong | G02B 7/09 |
| 2019/0384034 A1 | 12/2019 | Min et al. | |
| 2021/0041604 A1* | 2/2021 | Choi | G02B 27/646 |
| 2021/0048562 A1* | 2/2021 | Choi | G02B 7/282 |

FOREIGN PATENT DOCUMENTS

| | | |
|---|---|---|
| CN | 104730828 A | 6/2015 |
| CN | 104730828 B | 4/2017 |
| CN | 107153315 A | 9/2017 |
| CN | 109073792 A | 12/2018 |
| JP | 2013-64995 A | 4/2013 |
| JP | 2014-146048 A | 8/2014 |
| JP | 2014-228764 A | 12/2014 |
| KR | 10-2008-0014274 A | 2/2008 |
| KR | 10-0843473 B1 | 7/2008 |
| KR | 10-2009-0016933 A | 2/2009 |
| KR | 10-2009-0084424 A | 8/2009 |
| KR | 10-2011-0064156 A | 6/2011 |
| KR | 10-2015-0123004 A | 11/2015 |
| KR | 10-2017-0129532 A | 11/2017 |
| KR | 10-1805128 B1 | 12/2017 |
| KR | 10-2018-0098070 A | 9/2018 |
| KR | 10-2018-0110796 A | 10/2018 |
| TW | 200708917 A | 2/2007 |

\* cited by examiner

CAMERA DEVICE

CROSS REFERENCE TO RELATED APPLICATIONS

This application is the National Phase of PCT/KR2019/018619 filed on Dec. 27, 2019, which claims priority under 35 U.S.C. § 119(a) to Patent Application Nos. 10-2018-0172578; 10-2018-0172579; and 10-2018-0172580, all filed in the Republic of Korea on Dec. 28, 2018, all of which are hereby expressly incorporated by reference into the present application.

TECHNICAL FIELD

The present exemplary embodiment relates to a camera device.

BACKGROUND ART

The following description provides background information for the present exemplary embodiment and does not describe the prior art.

As various portable terminals are widely spread and commonly used, and wireless Internet services has been commercialized, the demands of consumer related to portable terminals have been diversified and various kinds of additional devices have been installed in portable terminals.

Among them, there is a camera device for photographing a subject as a photograph or a moving picture. Meanwhile, in recent camera devices, an autofocus function that automatically adjusts focus according to the distance of a subject is applied. In addition, an image stabilization function that prevents an image from shaking caused by the hand shaking of a photographer has been applied.

Recently, the development of a liquid lens that performs an autofocus function or an image stabilization function by changing the shape of the lens according to the application of a current is underway. Meanwhile, in a camera device using a liquid lens, when the gap between the lens module and the lens barrel is completely sealed with an adhesive, there is a problem in that the alignment becomes distorted because there is no vent hole for an internal air pressure to escape during curing after the active alignment (AA) and bonding of lens and the image sensor.

Furthermore, if an air vent hole is formed in the active alignment bonding line, it becomes a passage through which foreign substances are introduced into the image sensor after curing of the active alignment bonding, and thus, there is a problem in that the air vent hole needs to be blocked again.

Meanwhile, when the liquid lens is disposed spaced apart from the substrate on which the image sensor is disposed, an electrically conductive structure between the liquid lens and the substrate is required.

Furthermore, there is a disadvantage in that an additional work for electrically connecting the liquid lens and the electrically conductive structure, such as soldering, is required between the liquid lens and the electrically conductive structure.

DETAILED DESCRIPTION OF THE INVENTION

Technical Subject

The present exemplary embodiment aims to provide a camera device having an air vent hole through which the gas escapes during curing after the active alignment and bonding of lens and the image sensor The present exemplary embodiment aims to provide a camera device comprising an electrically conductive structure between a liquid lens and a substrate.

The present exemplary embodiment aims to provide a camera device comprising an electrically conductive structure capable of energizing a liquid lens without soldering and complex components.

Technical Solution

The camera device according to the present exemplary embodiment may comprise: a substrate; an image sensor disposed on the substrate; a base disposed on the substrate; a lens holder disposed on the base; a lens module disposed in the lens holder; a liquid lens module coupled to the lens module; and an adhesive for coupling the lens holder and the base, wherein the lens holder may comprise a groove formed between the base and the liquid lens module.

The camera device may further comprise a conductive member electrically connecting the liquid lens module and the substrate.

The groove may be formed from a lower area of the lens holder to an area adjacent to the liquid lens module.

The lower area of the lens holder may be an upper area of the base.

The groove may form a gas discharge path connecting the upper surface of the base to the lower surface of the liquid lens module.

The groove may form a path through which gas escapes.

The groove may be a groove extending long along the optical axis direction.

Both ends of the groove may be opened with respect to the optical axis direction.

The groove may form a path between the lens holder and the lens module so that the gas generated during the curing of the adhesive is discharged toward the liquid lens module.

The camera device according to the present exemplary embodiment may comprise: a base; a lens holder disposed on the base; a lens module coupled to the lens holder; a liquid lens module coupled to the lens module; and an adhesive for coupling the lens holder and the base, wherein the lens holder may comprise a recess, and a gas discharge path may be formed between the base and the liquid lens module by the recess of the lens holder so that the gas may be discharged toward the outside.

The gas may be generated by the adhesive.

The lens holder further comprises a groove formed in a lower surface of the lens holder, and an adhesive is disposed in the groove of the lens holder so that the lens holder and the lens module can be coupled.

The groove of the lens holder comprises four grooves symmetrical about the optical axis, the recess comprises two recesses symmetrical with respect to the optical axis, and the two recesses may be spaced apart from the four grooves.

The adhesive may be disposed between the upper surface of the base and the lens holder and between the side surface of the base and the lens holder.

The groove of the lens holder may comprise a chamfered surface.

The camera device comprises: an upper plate comprising holes; a lateral plate extending downward from the upper plate; and further comprises a cover covering the lens holder, wherein a gas discharge path may be formed between the lens module and the hole of the cover through the lower surface of the liquid lens module, the side surface of the liquid lens module, and the upper surface of the liquid lens module.

A first space is formed by the base, the lens holder and the lens module; a second space is formed by the liquid lens module, the lens holder and the lens module; and a path may be formed in the order of the first space, the second space, the side space of the liquid lens module, the upper space of the liquid lens module, and the holes of the cover.

The camera device according to the present exemplary embodiment comprises: a substrate; an image sensor disposed on the substrate; a base disposed on the substrate; a lens holder disposed on the base; a lens module disposed in the lens holder; a liquid lens module coupled to the lens module; an adhesive for coupling the lens holder and the base; and a conductive member electrically connecting the liquid lens module and the substrate, wherein a first space is formed between the base, the lens holder, and the lens module; a second space is formed between the liquid lens module, the lens module, and the lens holder; and the lens holder may comprise a groove connecting the first space and the second space.

The groove may be formed in an inner circumferential surface of the lens holder.

The lens holder comprises a lower surface facing the upper surface of the base, the adhesive is adhered to the upper surface of the base and the lower surface of the lens holder, and the groove of the lens holder may be extended from the lower surface of the lens holder to the upper surface of the lens holder.

The adhesive may seal between the base and the lens holder.

An adhesive may be disposed between the outer circumferential surface of the lens module and the lens holder, and a gap or a path may be formed without the adhesive being disposed in at least a portion of the groove of the lens holder.

The lens holder comprises a second groove formed in the inner circumferential surface of the lens holder, wherein the second groove of the lens holder extends from the lower surface of the lens holder but is spaced apart from the upper surface of the lens holder, and an adhesive may be applied to the second groove of the lens holder.

The liquid lens module comprises a liquid lens and a holder in which the liquid lens is disposed, the lens module comprises a barrel and a plurality of lenses disposed inside the barrel, the liquid lens is disposed between the plurality of lenses, and the lower surface of the holder may be disposed higher than the upper surface of the lens holder.

The conductive member may comprise: a first terminal disposed in the holder and connected to the liquid lens; a second terminal disposed in the lens holder and connected to the substrate; and an electrically conductive material connecting the first terminal and the second terminal.

The electrically conductive material may comprise any one or more of solder and a conductive adhesive.

The lens holder may comprise a protrusion extending from the upper surface of the lens holder toward the outside of the holder, wherein an electrically conductive adhesive may be disposed between the upper surface of the lens holder and the protrusion of the lens holder.

An adhesive for fixing the holder to the lens holder and the electrically conductive adhesive may be disposed in a portion of the second space, and a gap or a path may be formed in the remaining portion of the second space.

The conductive member comprises a conductive layer integrally formed on a surface of the lens holder, wherein the conductive layer may be extended along the upper surface of the lens holder and the side surface of the lens holder so that one end is connected to the substrate and the other end is connected to a terminal of the liquid lens module.

The conductive member may comprise a terminal formed into the lens holder by insert injection.

The camera device further comprises a cover comprising an upper plate comprising a hole and disposed over the lens holder, and a lateral plate extending from the upper plate and coupled to the lens holder, wherein the cover may be spaced apart from the conductive member.

The camera device according to the present exemplary embodiment comprises: a substrate; an image sensor disposed on the substrate; a base disposed on the substrate; a lens holder disposed on the base; a lens module comprising a plurality of lenses and disposed in the lens holder; a liquid lens module comprising a liquid lens disposed between the plurality of lenses and a terminal connected to the liquid lens; a conductive member electrically connecting the liquid lens module and the substrate; a first adhesive for adhering the lens holder and the lens module; and a second adhesive for adhering the base and the lens holder, wherein the lower surface of the liquid lens module is disposed above the lens holder, an electrically conductive material is disposed at the upper portion of the lens holder for connecting the terminal of the liquid lens module and the conductive member, and the second adhesive is disposed between the lower surface of the lens holder and the upper surface of the base, and wherein the lens holder may comprise a groove formed in the inner circumferential surface of the lens holder and extending from the lower surface of the lens holder up to the upper portion of the lens holder.

The groove may be formed along the inner circumferential surface of the lens holder.

The camera device according to the present exemplary embodiment comprises: a substrate; an image sensor disposed on the substrate; a lens holder disposed on the substrate; a lens barrel disposed within the lens holder; a liquid lens unit coupled to the lens barrel and comprising a liquid lens; a first terminal connected to the liquid lens; a second terminal disposed in the lens holder; and a conductor coupled to the first terminal and the second terminal, wherein the first terminal may comprise: a first area electrically connected to the liquid lens; and a second area extending in a direction perpendicular to the optical axis direction on the side surface of the liquid lens unit and coupled to the conductor, and wherein the second terminal may comprise a first area being overlapped with the second area of the first terminal in the optical axis direction and coupled to the conductor.

The first terminal may comprise an extension portion bent in the first area of the first terminal, and the second area of the first terminal may be bent and formed in the extension portion.

The second terminal comprises an extension portion bent in the first area of the second terminal; the first area of the second terminal is disposed on an upper surface of the lens holder; the extension portion of the second terminal is disposed on a side surface of the lens holder; and the end of the extension portion of the second terminal may be solder-bonded with the substrate.

The second area of the first terminal may be spaced apart from the upper surface of the lens holder.

The second area of the first terminal may be spaced apart from the first area of the second terminal and at least a portion of the conductor may be disposed therebetween.

The second area of the first terminal may be spaced apart from the first area of the second terminal in the optical axis direction.

The liquid lens unit may comprise a liquid lens holder, the liquid lens may be disposed in the liquid lens holder, and the first terminal may be disposed in the liquid lens holder to be electrically connected to the liquid lens.

The second terminal comprises a plurality of terminals; the lens holder comprises a sidewall forming an outer surface of the lens holder, and a partition wall connecting the upper surface of the lens holder and the sidewall; and the partition wall may be disposed between neighboring terminals of the plurality of terminals.

The second terminal may comprise a conductive layer formed integrally with the lens holder through insert injection into the lens holder or integrally with the surface of the lens holder.

All of the plurality of terminals may be disposed on one side of the lens holder.

The first terminal comprises: an upper terminal connected to the individual electrode of the liquid lens; and a lower terminal connected to the common electrode of the liquid lens, wherein the lower terminal may comprise: a first lower terminal disposed in the liquid lens holder and partially extending outward of the liquid lens holder; and a plate-shaped second lower terminal connecting the common electrode of the liquid lens.

The lens holder may comprise a groove formed in an upper surface of the lens holder and the first terminal disposed therein, and the conductor may be disposed in the groove of the lens holder.

One end of the first terminal may be connected to the terminal of the liquid lens, and the other end may be connected to the conductor.

The liquid lens may comprise: four individual terminals formed at four corners of the upper surface of the liquid lens; and four common terminals formed at four corners of the lower surface of the liquid lens, wherein the first terminal may comprise: four upper terminals disposed on an upper surface of the liquid lens holder and connected to the four individual terminals of the liquid lens, respectively; and one lower terminal disposed on a lower surface of the liquid lens holder and connecting the four common terminals of the liquid lens.

Each of the upper terminal and the lower terminal may comprise a first portion disposed on a side surface of the liquid lens holder, and a second portion extending outward from the first portion and connected to the conductor.

At least a portion of the conductor may be disposed between the second portion and the second terminal of each of the upper terminal and the lower terminal.

The conductor may comprise a silver (Ag) epoxy.

The camera device according to the present exemplary embodiment may comprise: a base; a lens holder disposed on the base; a lens module disposed in the lens holder; a liquid lens module coupled to the lens module; a conductive member disposed in the lens holder and electrically connected to the liquid lens module; and an electrically conductive material disposed on a portion of the conductive member, wherein the liquid lens module comprises: a holder, a liquid lens disposed in the holder, and a terminal disposed in the holder and connected to a terminal of the liquid lens, wherein the terminal of the liquid lens module protrudes from the holder and is spaced apart from the conductive member and overlaps with the conductive member in a vertical direction, and wherein the electrically conductive material may be disposed between the terminal of the liquid lens module and the conductive member to connect the terminal and the conductive member of the liquid lens module.

The camera device according to the present exemplary embodiment comprises: a substrate; an image sensor disposed on the substrate; a lens holder disposed on the substrate; a lens module disposed in the lens holder; a liquid lens module coupled to the lens module; and a conductive member disposed in the lens holder and electrically connecting the substrate and the liquid lens module, wherein the liquid lens module comprises: a spacer; a liquid lens disposed in the spacer; and a terminal coupled to the spacer and electrically connected to the liquid lens, wherein the terminal is disposed on an outer side surface of the spacer, and the conductive member has elasticity and may comprise an elastic contact portion in direct contact with the terminal of the liquid lens module.

The terminal comprises a plurality of terminals, wherein the plurality of terminals may comprise: four upper terminals disposed on the upper surface of the spacer and the outer side surface of the spacer and connected to individual terminals of the liquid lens; and a lower terminal disposed on the lower surface of the spacer and the outer side surface of the spacer and connected to a common terminal of the liquid lens.

The lower terminal may comprise: a first lower terminal disposed on the lower surface of the spacer and the outer side surface of the spacer; and a second lower terminal having the shape of a plate, being coupled to the lower surface of the spacer, and connecting the common terminal and the first lower terminal of the liquid lens.

The spacer comprises a groove formed in the upper surface of the spacer, and each of the four upper terminals may comprise: a body portion disposed on the upper surface of the spacer; a first coupling portion extending from the body portion and connected to the individual terminal of the liquid lens; a second coupling portion extending from the body portion and disposed on the outer side surface of the spacer and connected to the conductive member; and an extension portion extending from the body portion and inserted into the groove of the spacer.

The body portion of the upper terminal may comprise: a first end portion disposed inner side the outer circumferential surface of the spacer; and a second end portion more protruding than the outer circumferential surface of the spacer.

The second lower terminal may comprise: a first coupling portion connected to the common terminal of the liquid lens; a second coupling portion connected to the first lower terminal; and a connecting portion coupled to the lower surface of the spacer and connecting the first coupling portion and the second coupling portion.

The elastic contact portion of the conductive member may be a contact spring that elastically presses the terminal of the liquid lens module to maintain contact with the terminal of the liquid lens module.

The conductive member may comprise: a first portion disposed on a side surface of the lens holder and having a lower end connected to a terminal of the substrate; and a second portion disposed on an upper surface of the lens holder and connecting an upper end of the first part to an upper end of the elastic contact part.

The conductive member may be integrally formed, and the elastic contact portion may be bent to form an obtuse angle with the second portion.

The second portion may be bent to form a right angle with the first portion.

The elastic contact portion of the conductive member may press the spacer inward from both sides.

A cover comprising an upper plate and a lateral plate extending downward from the upper plate is further comprised, and the lens holder may comprise: a first groove formed in the side surface of the lens holder; and a second groove formed in the upper surface of the lens holder, wherein the first portion of the conductive member is disposed in the first groove of the lens holder, and the second portion of the conductive member may be disposed in the second groove of the lens holder so that it may be spaced apart from the cover.

The camera device according to the present exemplary embodiment comprises: a base; a lens holder disposed on the base; a lens module disposed in the lens holder; a liquid lens module coupled to the lens module; and a contact spring disposed in the lens holder and electrically connected to the liquid lens module and at least partially elastic, wherein the liquid lens module comprises a spacer; a liquid lens disposed in the spacer; and a terminal coupled to the spacer and electrically connected to the liquid lens, wherein the terminal comprises a first terminal disposed on a first side surface of the spacer, and a second terminal disposed on a second side surface opposite to the first side surface of the spacer, and wherein the contact spring may be disposed at each of the first terminal and the second terminal.

Advantageous Effects

Through the present exemplary embodiment, it is possible to secure a path through which the curing gas of the active alignment bonding escapes while securing the bonding reliability between the lens module and the lens barrel.

Therefore, the phenomenon that the alignment is distorted during curing after active alignment bonding can be prevented.

Through the present exemplary embodiment, an electrically conductive structure capable of electrically connecting the terminal connected to the liquid lens without external pressure can be provided.

In addition, it is possible to secure stable resistance by increasing the contact area between terminals through the present exemplary embodiment.

In addition, by applying the bond tank structure to the lens holder through the present exemplary embodiment, it is possible to stably apply the electrically conductive material and prevent short related failures.

In addition, through the electrical connection through a silver (Ag) epoxy of the present exemplary embodiment, the phenomenon of deterioration of the liquid lens characteristics due to the high heat generated in the process such as soldering is prevented.

In addition, the present exemplary embodiment is advantageous in reducing size and increasing the number of connecting pins.

Through the present exemplary embodiment, the liquid lens can be electrically conductive simply by inserting the liquid lens into the lens holder without soldering and complicated components.

In addition, through the present contact spring type terminal modularization of the electrical conduction method becomes possible, and it has flexibility in increasing the size in response to the increase in the number of electrodes or increase in the planar size of the inner components such as the lens holder.

In addition, in the present exemplary embodiment, as the fixing between the lens and the lens holder is performed at the lower side, it has an advantage of securing a stable quality of the fixing strength compared to the bond application from the upper side.

BRIEF DESCRIPTION OF DRAWINGS

FIG. 18b is a perspective view of a partial configuration of the camera device of shown in FIG. 18a.

BEST MODE

Figure 1:
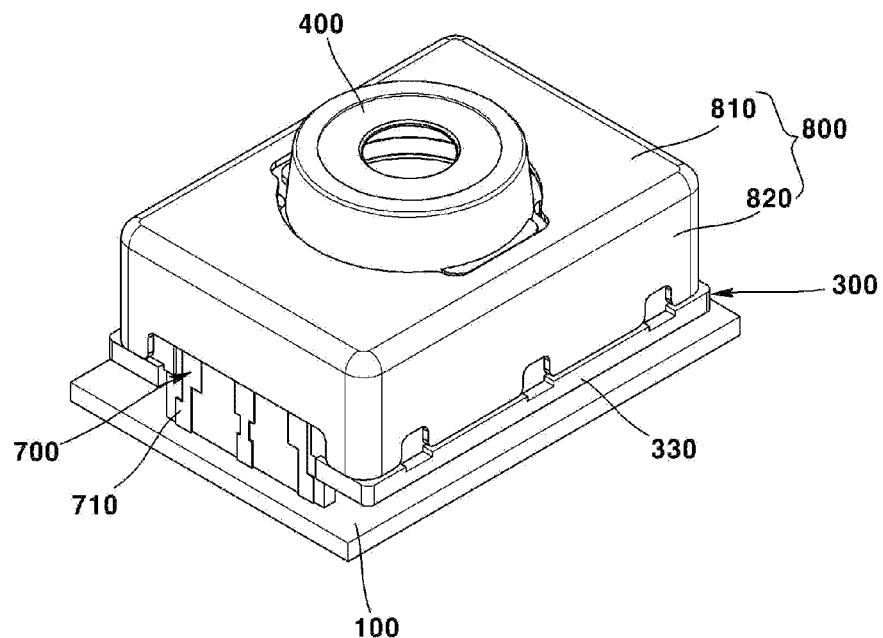
FIG. 1 is a perspective view of a camera device according to a first exemplary embodiment.

Hereinafter, exemplary embodiments of the present invention will be described in detail with reference to the accompanying drawings.

However, the technical ideas of the present invention are not limited to some exemplary embodiments described, but may be implemented in various forms, and within the technical idea of the present invention, one or more of the components between the exemplary embodiments may be selectively combined or substituted.

In addition, the terms (including technical and scientific terms) used in the exemplary embodiments of the present invention may be generally understood by those skilled in the art to which the present invention belongs, unless specifically defined and described. Commonly used terms, such as terms defined in a dictionary, may be interpreted as meanings in consideration of the contextual meaning of the related art.

In addition, the terms used in the exemplary embodiments of the present invention are intended to describe the exemplary embodiments and are not intended to limit the present invention.

In this specification, the singular may also include the plural unless specifically stated in the text, and when it is described as "at least one (or, one or more) of A, B, and C", it may include one or more of any combinations of A, B and C.

In describing the components of the exemplary embodiment of the present invention, terms such as first, second, A, B, (a), and (b) may be used. These terms are merely intended to distinguish the components from other components, and the terms do not limit the nature, order or sequence of the components.

When a component is described as being "connected", "coupled", or "jointed" to another component, it may not only include a case wherein the component is directly "connected", "coupled", or "jointed" to another component, but also include a case wherein the component is "connected", "coupled", or "jointed" to another component due to yet another component existing between the component and the other component.

In addition, when described as being formed or disposed on the "top (above)" or "bottom (below)" of each component, "top (above)" or "bottom (below)" includes not only the case where the two components are in direct contact with each other, but also the case where one or more other components are formed or disposed between the two components. In addition, when expressed as "top (above)" or "bottom (below)", it may include the meaning of the downward direction as well as the upward direction with respect to one component.

Hereinafter, the configuration of an optical apparatus according to the present exemplary embodiment will be described.

The optical apparatus may be any one of a mobile phone, a mobile phone, a smart phone, a portable smart device, a digital camera, a laptop computer, a digital broadcasting terminal, a personal digital assistant (PDA), a portable multimedia player (PMP), and a navigation device. However, the type of the optical apparatus is not limited thereto, and any device for capturing an image or a picture may be included in the optical apparatus.

The optical apparatus may comprise a main body. The main body may form an outer appearance of the optical apparatus. The main body may accommodate a camera device. A display unit may be disposed on one surface of the main body. For example, the display unit and the camera device may be disposed on one surface of the main body, and another camera device may be additionally disposed on the other surface (a surface opposite to the one surface) of the main body.

The optical apparatus may comprise a display unit. The display unit may be disposed on one surface of the main body. The display unit may output an image captured by the camera device.

The optical apparatus may comprise a camera device. The camera device may be disposed in the main body. At least a portion of the camera device may be accommodated in the main body. The camera device may be provided in plurality. The camera device may be disposed respectively on one surface of the main body and the other surface of the main body. The camera device may capture an image of a subject.

Hereinafter, a configuration of a camera device according to a first exemplary embodiment and modified examples will be described with reference to the drawings.

Figure 2:
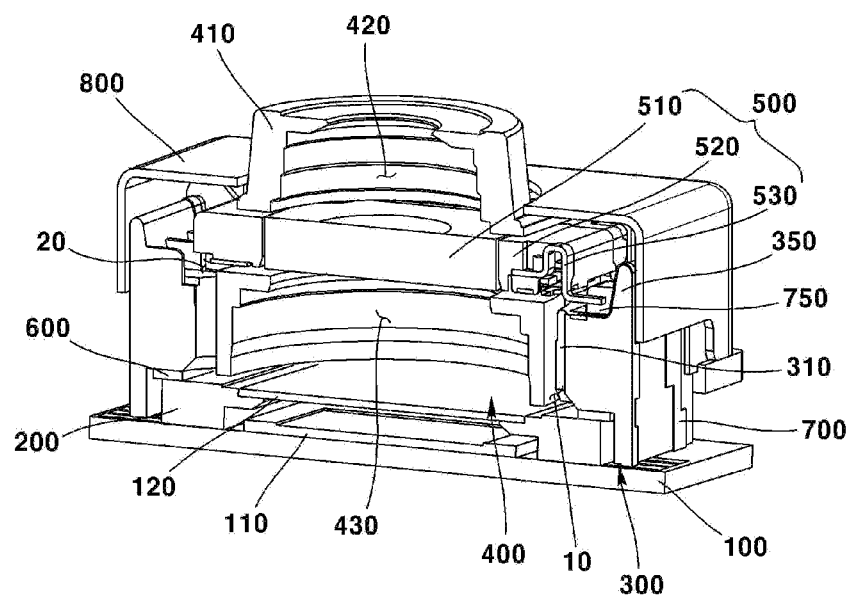
FIG. 2 is a cross-sectional perspective view of the camera device according to the first exemplary embodiment.
Figure 3:
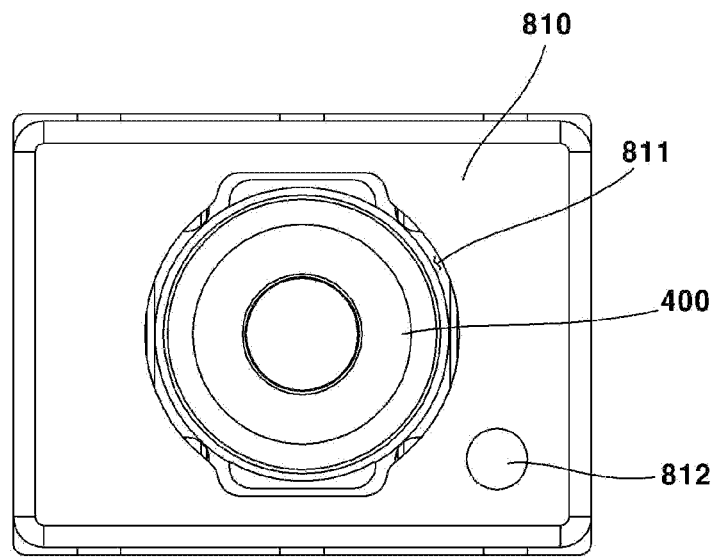
FIG. 3 is a plan view of a partial configuration of the camera device according to the first exemplary embodiment.
Figure 4:
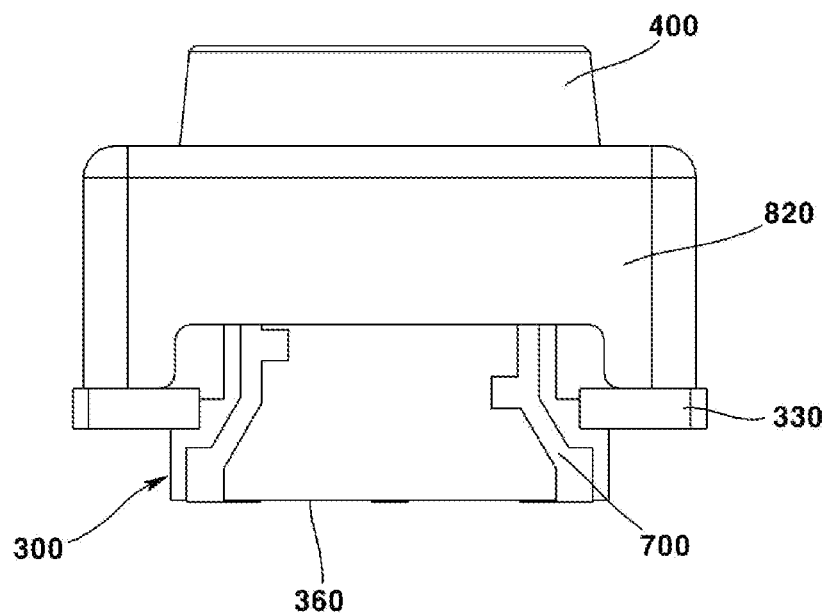
FIG. 4 is a side surface view of a partial configuration of the camera device according to the first exemplary embodiment.
Figure 5:
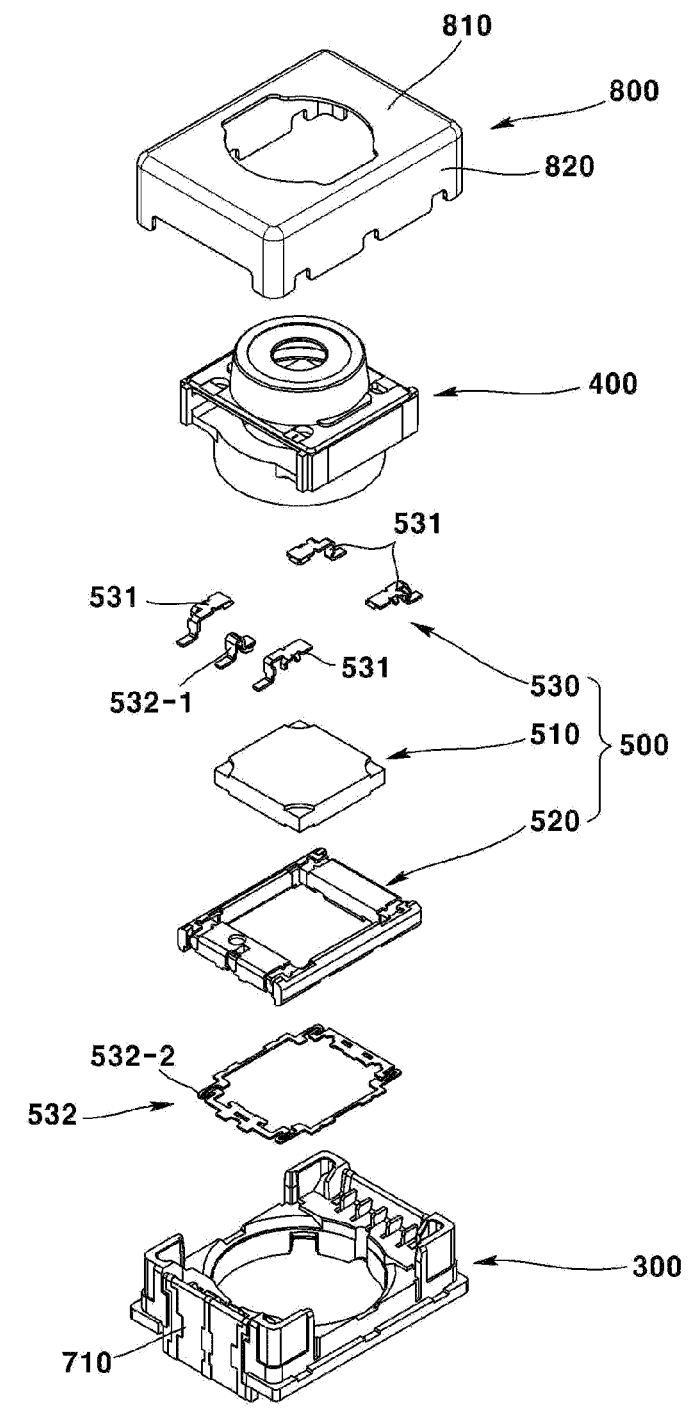
FIG. 5 is an exploded perspective view of a partial configuration of the camera device according to the first exemplary embodiment.
Figure 6:
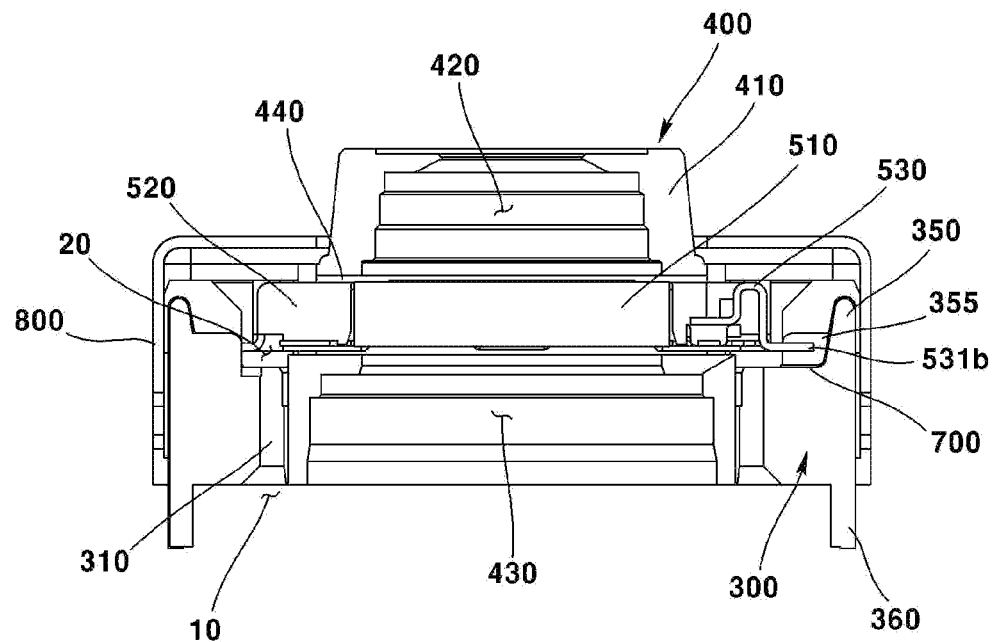
FIG. 6 and FIG. 7 is a cross-sectional view of a partial configuration of the camera device according to the first exemplary embodiment.
Figure 7:
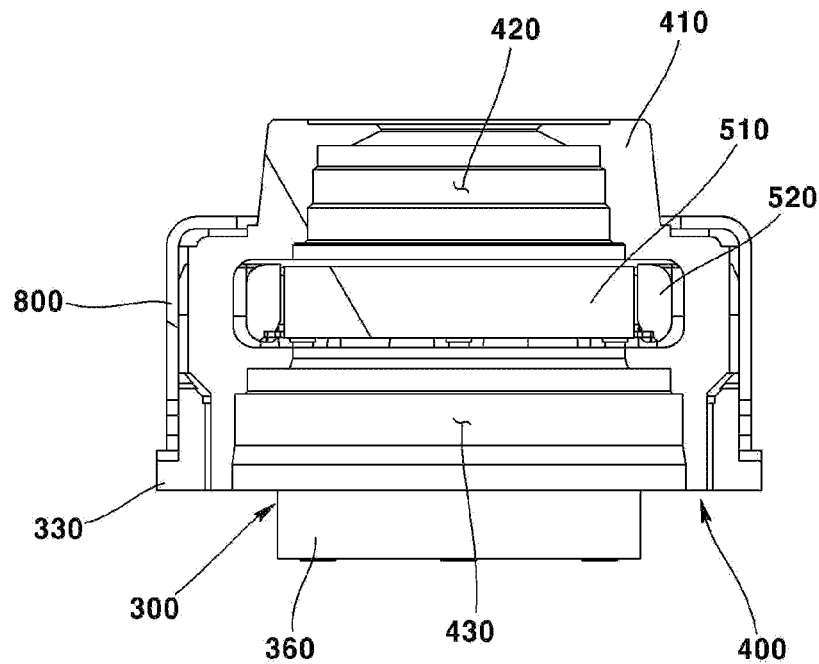
Figure 8:
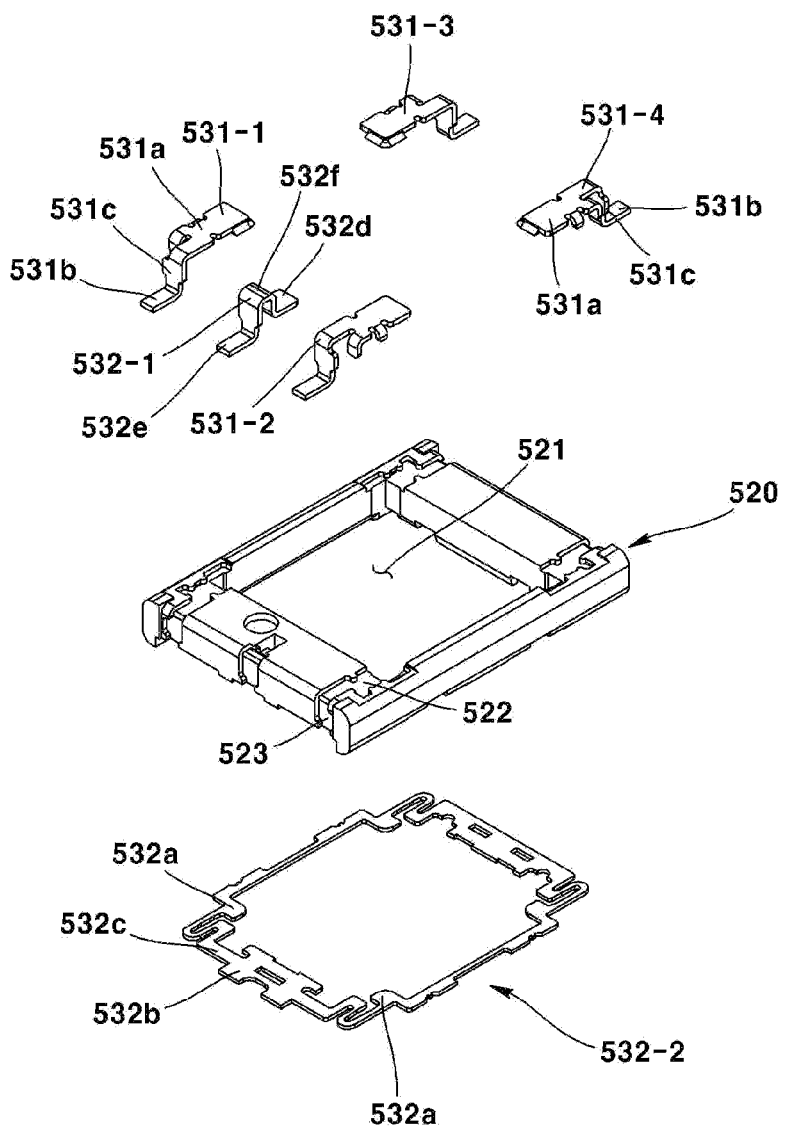
FIG. 8 is an exploded perspective view of a partial configuration of a camera device according to the first exemplary embodiment.
Figure 9:
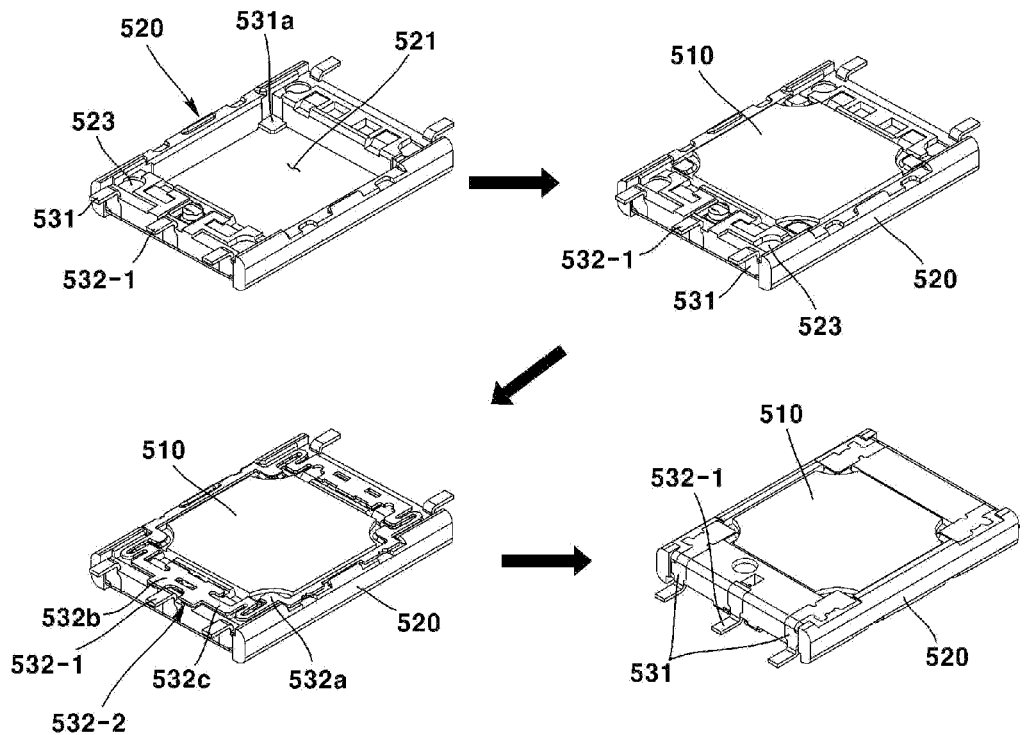
FIG. 9 is a diagram illustrating a process of assembling a liquid lens module of the camera device according to the first exemplary embodiment.
Figure 10:
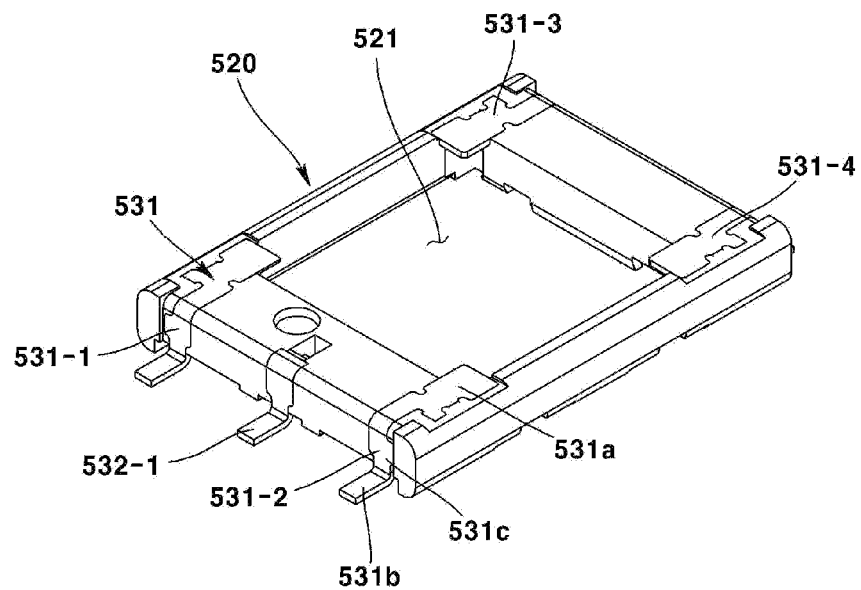
FIG. 10 is a perspective view illustrating a holder and a terminal of the liquid lens module of the camera device according to the first exemplary embodiment.
Figure 11:
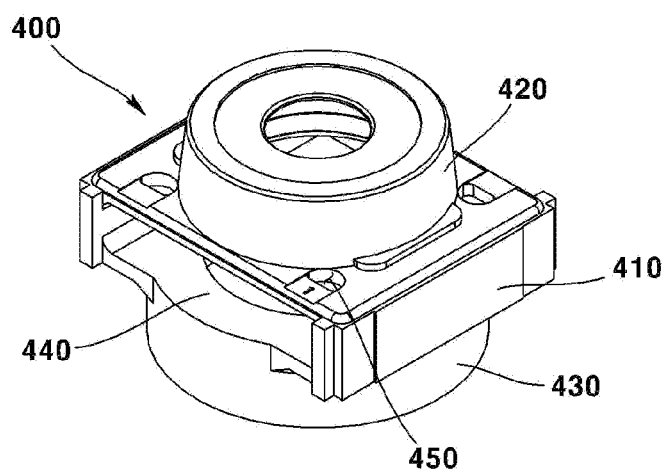
FIG. 11 is a perspective view of the lens module of the camera device according to the first exemplary embodiment.
Figure 12A:
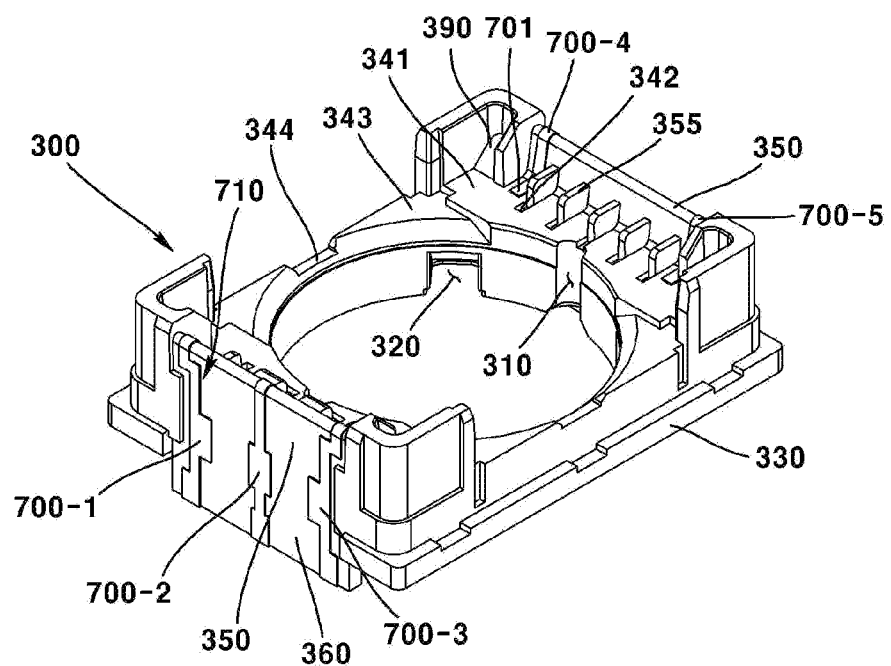
FIG. 12a is a perspective view of a lens holder of the camera device according to the first exemplary embodiment.
Figure 12B:
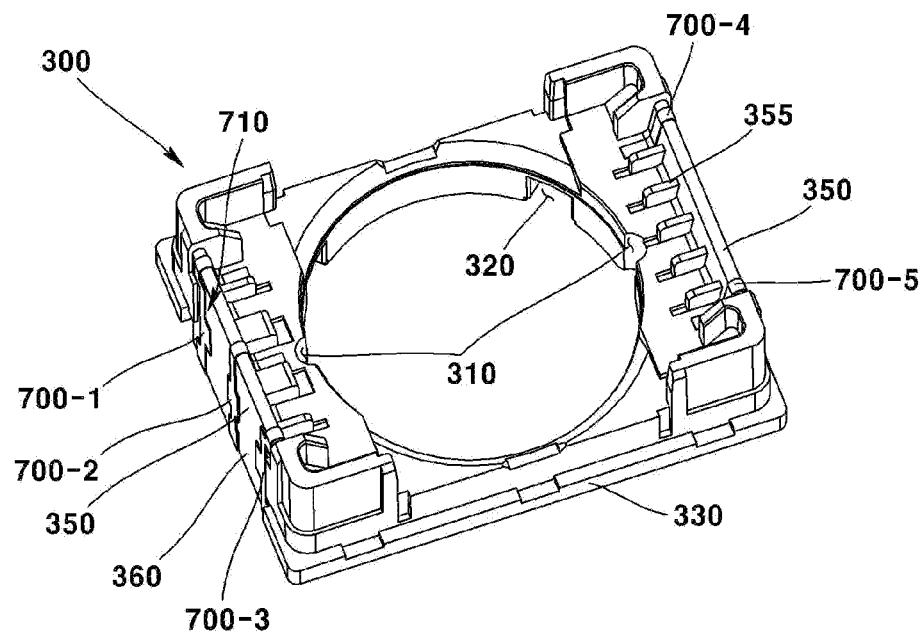
FIG. 12b is a perspective view of the lens holder of the camera device shown in FIG. 12a viewed from a different direction.
Figure 12C:
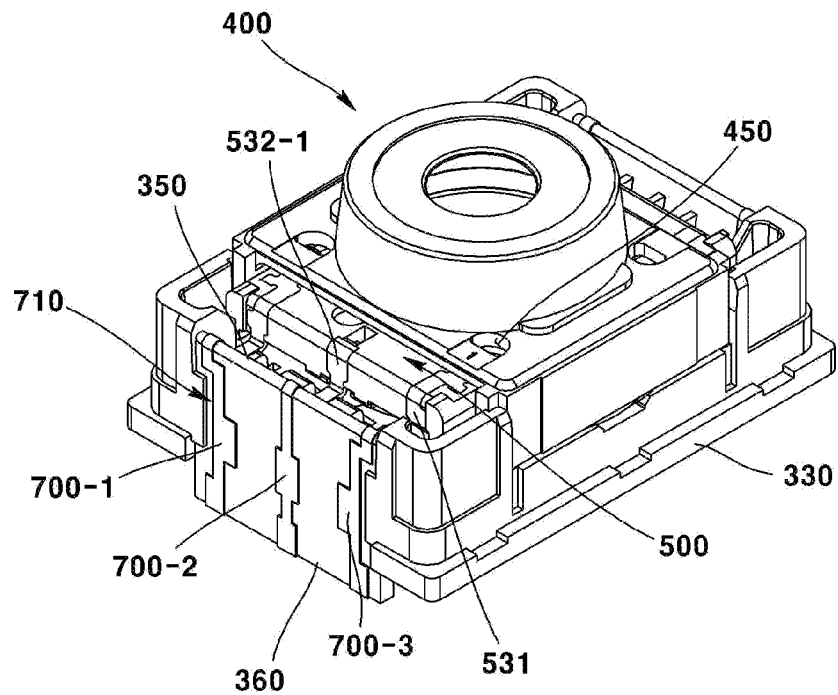
FIG. 12c is a perspective view of a partial configuration of a camera device according to the first exemplary embodiment.
Figure 13:
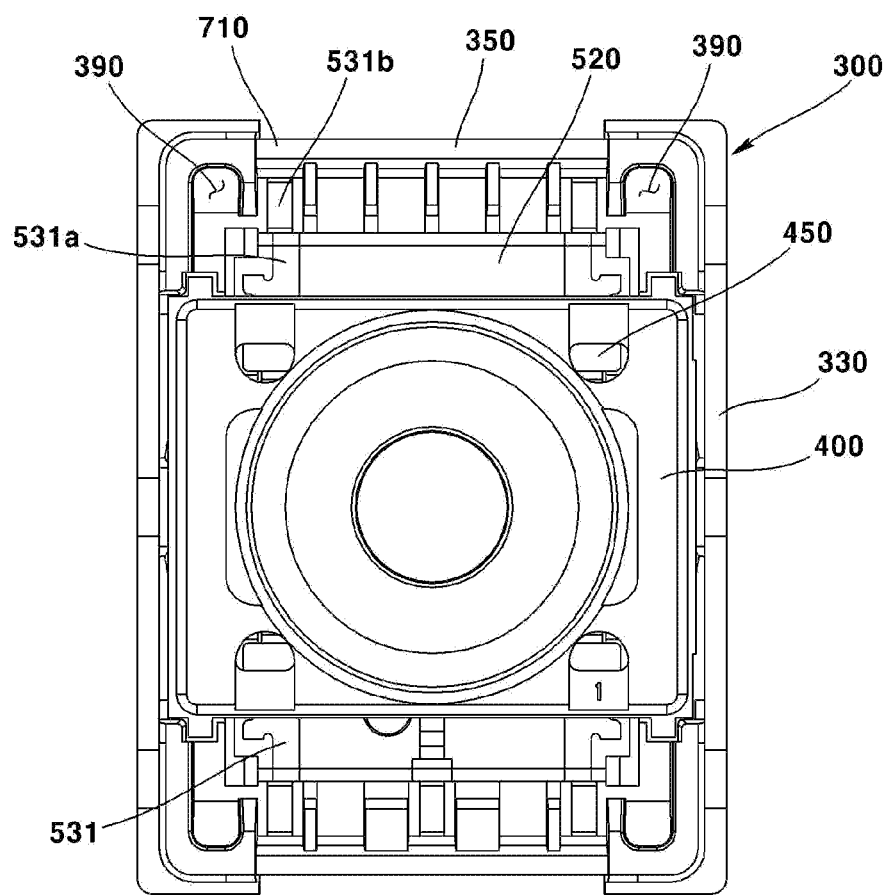
FIG. 13 is a plan view of the camera device according to the first exemplary embodiment, in which the cover thereof is removed.
Figure 14:
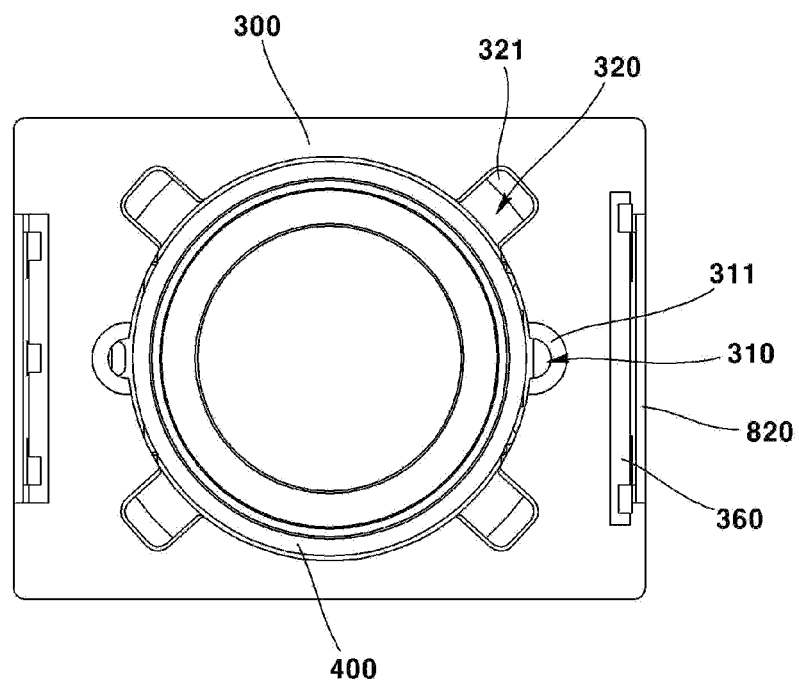
FIG. 14 is a bottom view of a partial configuration of the camera device according to the first exemplary embodiment.
Figure 15:
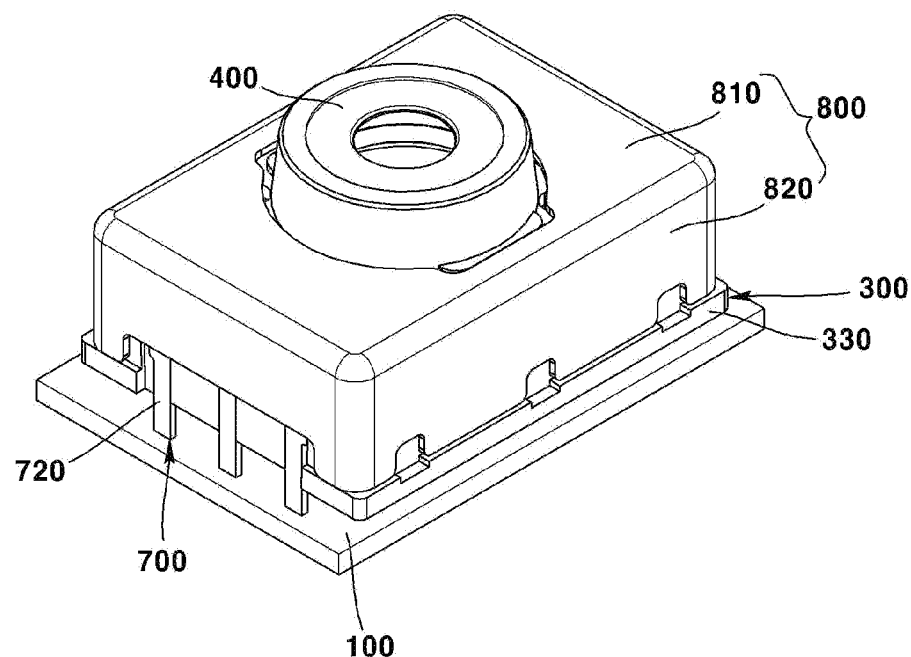
FIG. 15 is a perspective view of a camera device according to a modified example.
Figure 16:
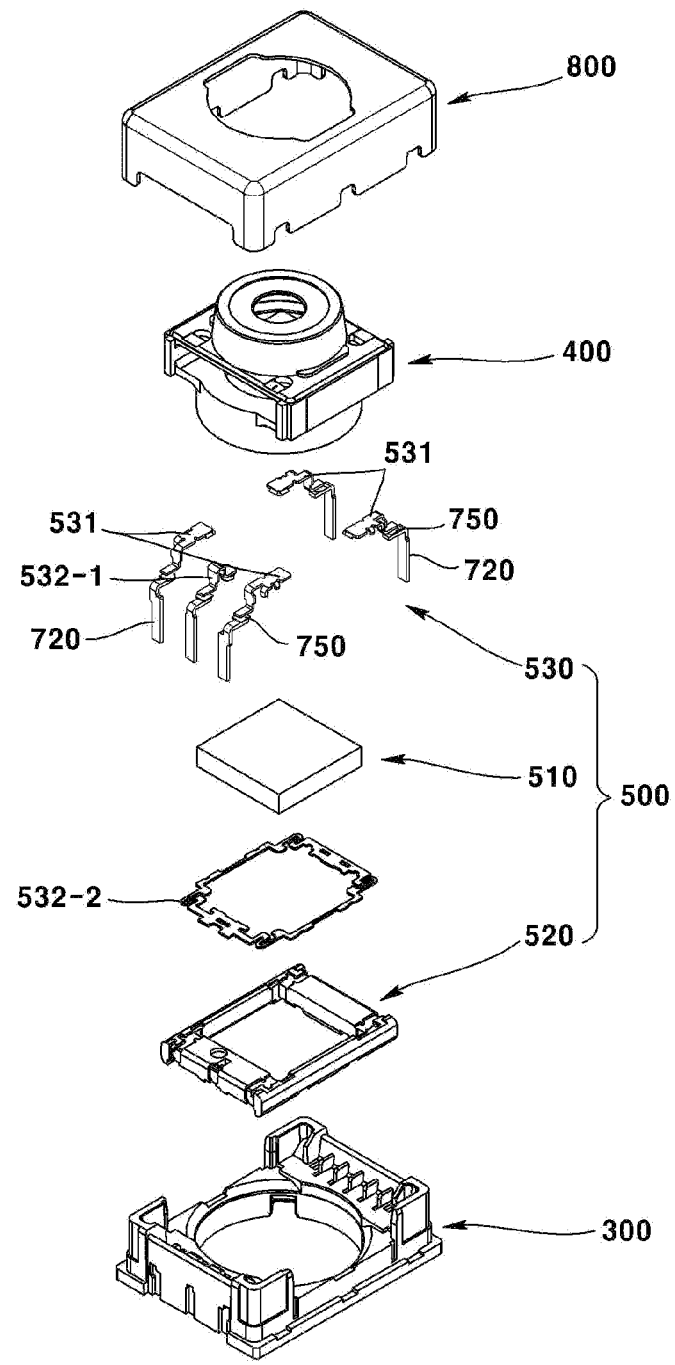
FIG. 16 is an exploded perspective view of a partial configuration of the camera device according to the modified example.
Figure 17A:
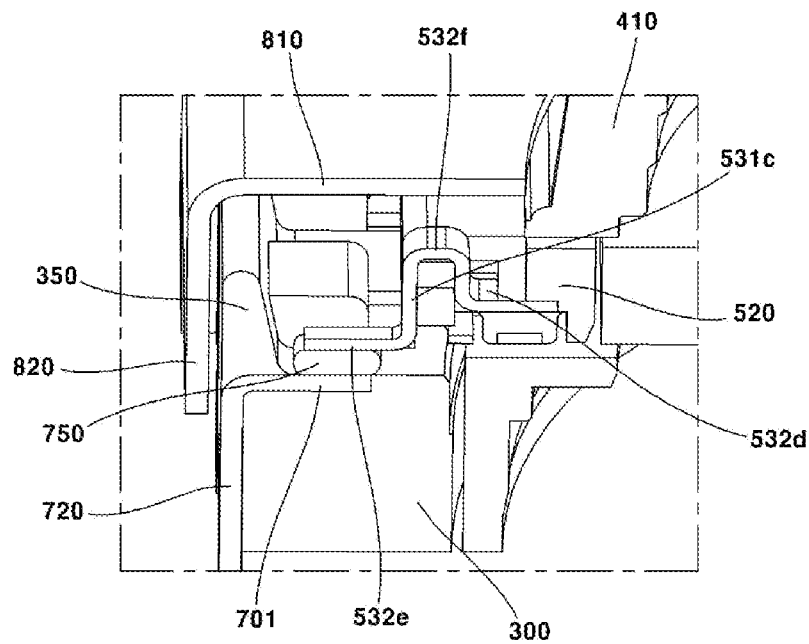
FIG. 17a is a cross-sectional perspective view of a partial configuration of the camera device according to the modified example.
Figure 17B:
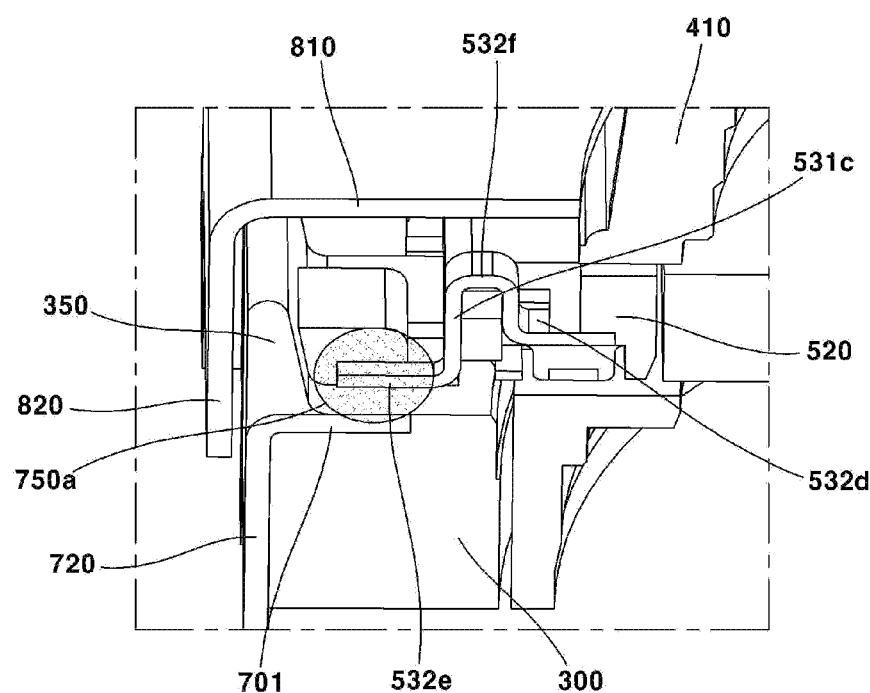
FIG. 17b is a cross-sectional perspective view of a partial configuration of a camera device according to another modified example.
Figure 18A:
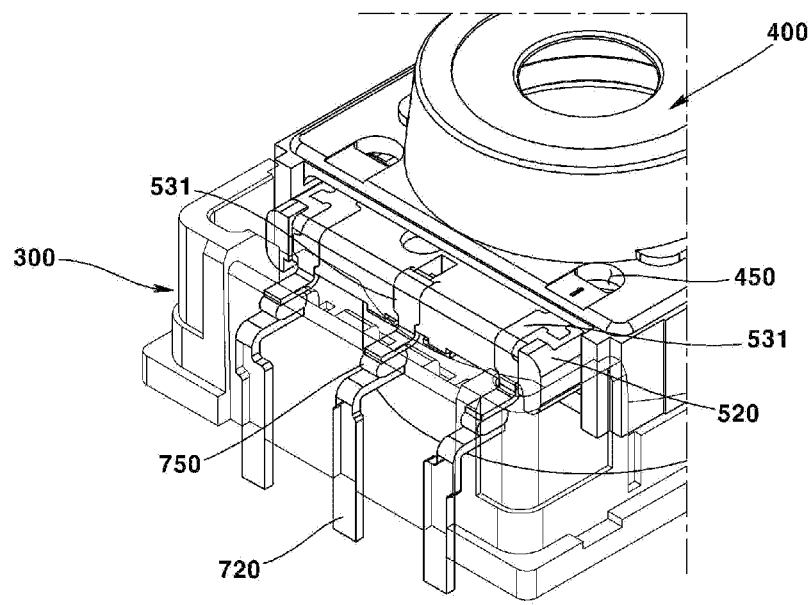
FIG. 18a is a partial projection view of a partial configuration of the camera device according to the modified example.
Figure 18B:
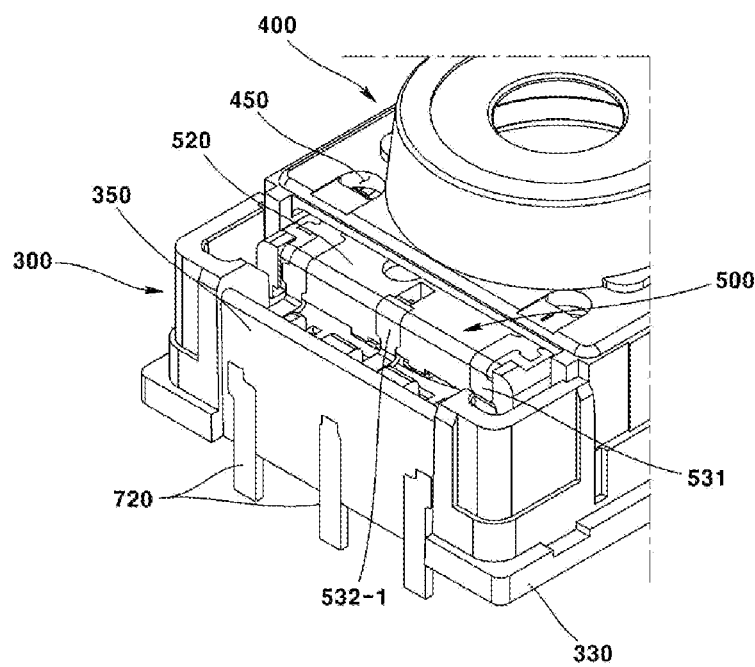
Figure 19:
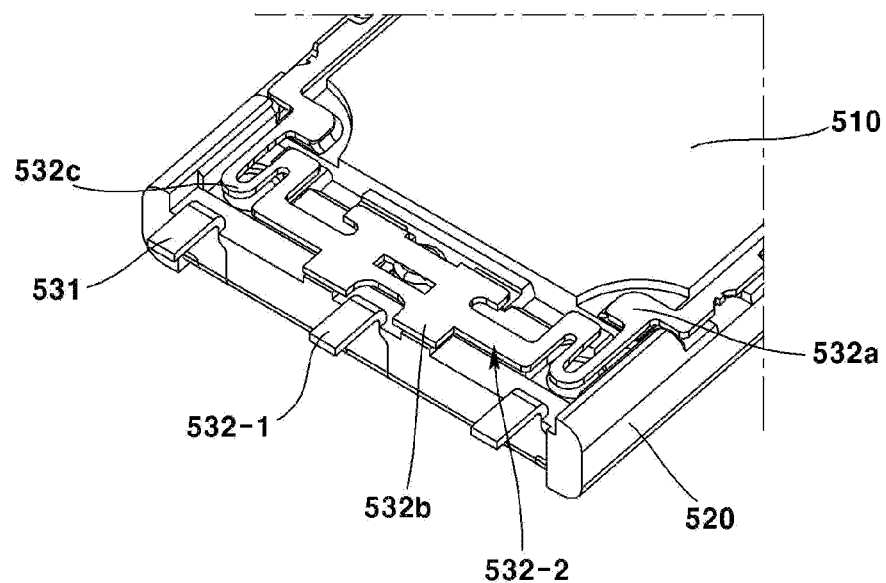
FIG. 19 is a bottom perspective view of a partial configuration of the camera device according to the modified example.
Figure 20:
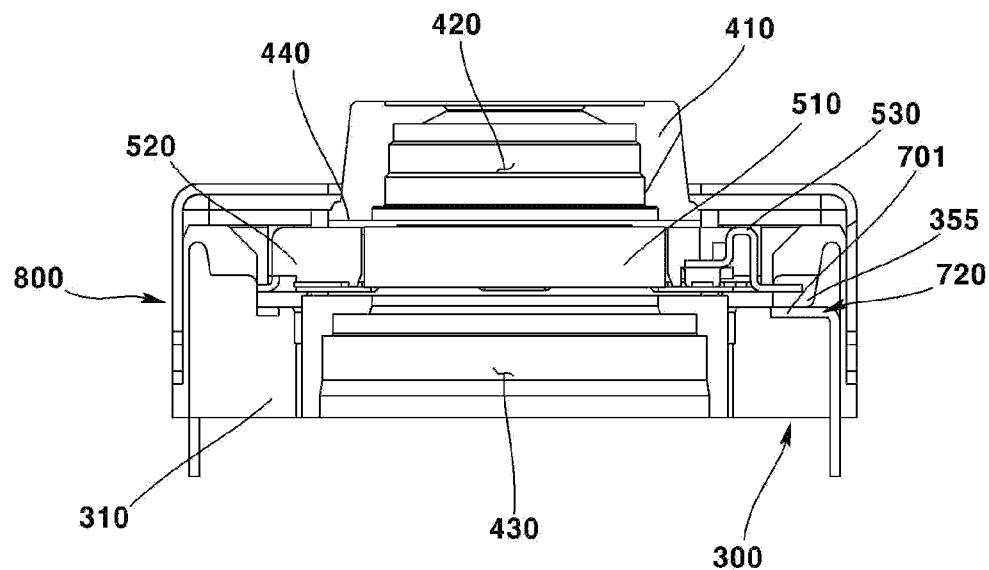
FIG. 20 is a cross-sectional view of a partial configuration of the camera device according to the modified example.
Figure 21:
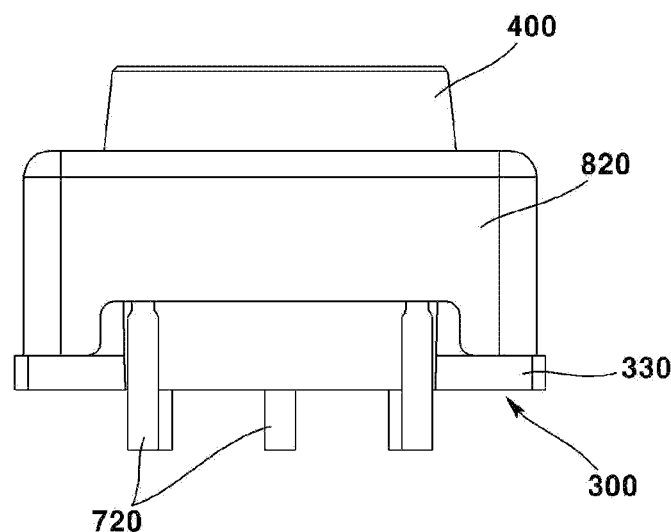
FIG. 21 is a side view of a partial configuration of the camera device according to the modified example.
Figure 22:
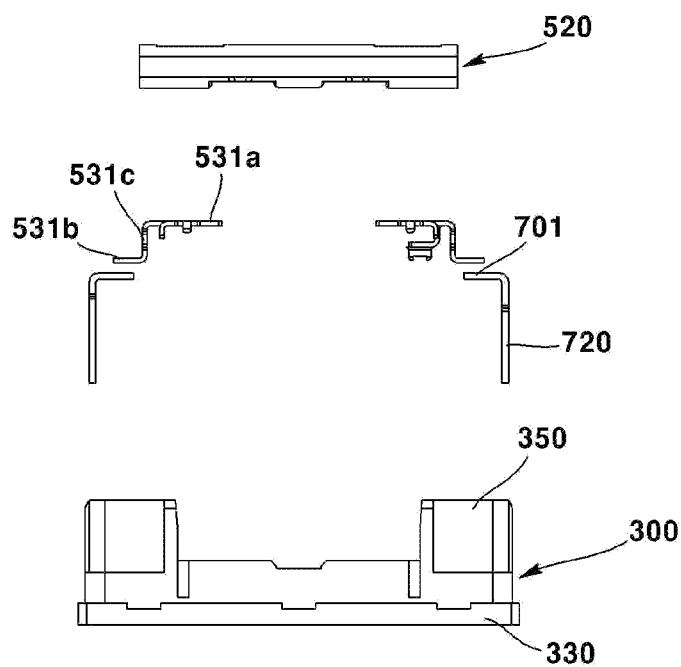
FIG. 22 is an exploded view of a partial configuration of the camera device according to the modified example.

FIG. 1 is a perspective view of a camera device according to a first exemplary embodiment; FIG. 2 is a cross-sectional perspective view of the camera device according to the first exemplary embodiment; FIG. 3 is a plan view of a partial configuration of the camera device according to the first exemplary embodiment; FIG. 4 is a side surface view of a partial configuration of the camera device according to the first exemplary embodiment; FIG. 5 is an exploded perspective view of a partial configuration of the camera device according to the first exemplary embodiment; FIG. 6 and FIG. 7 is a cross-sectional view of a partial configuration of the camera device according to the first exemplary embodiment; FIG. 8 is an exploded perspective view of a partial configuration of a camera device according to the first exemplary embodiment; FIG. 9 is a diagram illustrating a process of assembling a liquid lens module of the camera device according to the first exemplary embodiment; FIG. 10 is a perspective view illustrating a holder and a terminal of the liquid lens module of the camera device according to the first exemplary embodiment; FIG. 11 is a perspective view of the lens module of the camera device according to the first exemplary embodiment; FIG. 12a is a perspective view of a lens holder of the camera device according to the first exemplary embodiment; FIG. 12b is a perspective view of the lens holder of the camera device shown in FIG. 12a viewed from a different direction; FIG. 12c is a perspective view of a partial configuration of a camera device according to the first exemplary embodiment; FIG. 13 is a plan view of the camera device according to the first exemplary embodiment, in which the cover thereof is removed; FIG. 14 is a bottom view of a partial configuration of the camera device according to the first exemplary embodiment; FIG. 15 is a perspective view of a camera device according to a modified example; FIG. 16 is an exploded perspective view of a partial configuration of the camera device according to the modified example; FIG. 17a is a cross-sectional perspective view of a partial configuration of the camera device according to the modified example; FIG. 17b is a cross-sectional perspective view of a partial configuration of a camera device according to another modified example; FIG. 18a is a partial projection view of a partial configuration of the camera device according to the modified example; FIG. 18b is a perspective view of a partial configuration of the camera device of shown in FIG. 18a; FIG. 19 is a bottom perspective view of a partial configuration of the camera device according to the modified example; FIG. 20 is a cross-sectional view of a partial configuration of the camera device according to the modified example; FIG. 21 is a side view of a partial configuration of the camera device according to the modified example; and FIG. 22 is an exploded view of a partial configuration of the camera device according to the modified example.

The camera device may comprise a substrate 100. The substrate 100 may be a printed circuit board (PCB). The substrate 100 may comprise an upper surface. An image sensor 110, a base 200, and a lens holder 300 may be disposed on the upper surface of the substrate 100. However, the upper surface of the substrate 100 and the lens holder 300 may be spaced apart. The substrate 100 may comprise a terminal. The terminal of the substrate 100 may be connected to a conductive member 700.

The camera device may comprise an image sensor 110. The image sensor 110 may be disposed in the substrate 100. The image sensor 110 may be disposed on the substrate 100. The image sensor 110 may be disposed on the upper surface of the substrate 100. The image sensor 110 may be electrically connected to the substrate 100. In one example, the image sensor 110 may be coupled to the substrate 100 by surface mounting technology (SMT). As another example, the image sensor 110 may be coupled to the substrate 100 by flip chip technology. The image sensor 110 may be disposed to coincide with the lens and the optical axis. That is, the optical axis of the image sensor 110 and the optical axis of the lens may be aligned. The image sensor 110 may convert light irradiated to the effective image area of the image sensor 110 into an electrical signal. The image sensor 110 may be any one of a charge coupled device (CCD), a metal oxide semiconductor (MOS), a CPD, and a CID.

The camera device may comprise a filter 120. The filter 120 may comprise an infrared filter. The infrared filter may block the infrared light incidenting onto the image sensor. The infrared filter can reflect infrared light. Alternatively, the infrared filter may absorb infrared light. The infrared filter may be disposed between a liquid lens module 500 and the image sensor 110. The infrared filter may be disposed in the hole of the base 200.

The camera device may comprise a base 200. The base 200 may be disposed in the substrate 100. The base 200 may be disposed on the substrate 100. The base 200 may be disposed between the substrate 100 and the lens holder 300. The base 200 may comprise a groove formed on the upper surface and in which the filter 120 is disposed. A portion of the lower surface of the base 200 may be recessed to form a space in which the image sensor 110 is disposed.

The camera device may comprise a lens holder 300. The lens holder 300 may be disposed on the substrate 100. The lens holder 300 may be disposed on the base 200. The lens holder 300 may be disposed above the base 200. The lens holder 300 may be coupled to the base 200. The lens holder 300 may be coupled to the lens module 400. The lens holder 300 may be disposed inside the cover 800. The lens holder 300 may be formed of an insulating material.

The lens holder 300 may comprise a first groove 310. Hereinafter, the first groove 310 may be used as a groove or recess. The first groove 310 may be a vent hole. The first groove 310 may be a path through which gas is discharged. The first groove 310 may be a path through which gas flows. The first groove 310 may be formed in the lens holder 300. The first groove 310 may be formed in the inner circumferential surface of the lens holder 300. The first groove 310 may be formed along the inner circumferential surface of the lens holder 300. The first groove 310 may be disposed between the base 200 and the liquid lens module 500. The first groove 310 may be formed from a lower area of the lens holder 300 to an area adjacent to the liquid lens module 500. In this case, the lower area of the lens holder 300 may be an upper area of the base 200. The first groove 310 may form a gas discharge path connecting from the upper surface of the base 200 to the lower surface of the liquid lens module 500. The first groove 310 may form a path through which the gas escapes. The first groove 310 may be a groove extending along the optical axis direction. Both ends of the first groove 310 may be opened with respect to the optical axis direction. The first groove 310 may form a path between the lens holder 300 and the lens module 400 so that the gas generated during the curing process of an adhesive 600 is discharged toward the liquid lens module 500. The first groove 310 may comprise a chamfered surface 311. The chamfered surface 311 may be disposed at the bottom of the first groove 310. The chamfered surface 311 may obliquely connect the inner circumferential surface of the first groove 310 and the lower surface of the lens holder 300.

In a modified example, the first groove 310 may be formed in the lens module 400. That is, the first groove 310 forms a path between the lens holder 300 and the lens module 400 and it may be formed in the lens holder 300 and/or the lens module 400.

At least one first groove 310 may be formed. The first groove 310 may comprise a plurality of grooves. The first groove 310 may comprise two grooves. The two grooves of the first groove 310 may be symmetrically disposed about the optical axis. The first groove 310 may comprise three grooves. At this time, the three grooves of the first groove 310 may be disposed at 120 degree intervals on the inner circumferential surface of the lens holder 300. The first groove 310 may comprise four grooves. At this time, the four grooves of the first groove 310 may be disposed at an interval of 90 degrees in the inner circumferential surface of the lens holder 300. The first groove 310 may comprise five or more grooves. At this time, the plurality of grooves of the first groove 310 may be disposed at equal intervals in the inner circumferential surface of the lens holder 300.

In a modified example, the first groove 310 may be formed on the outer circumferential surface of the lens module 400 instead of the lens holder 300.

In the first exemplary embodiment, since the vent hole is formed through the first groove 310, a bond for preventing the introduction of additional foreign substances from the camera device does not need to be applied.

The lens holder 300 may comprise a recess. At this time, the recess may comprise the first groove 310 mentioned previously. In the first exemplary embodiment, the gas discharge path may be formed by the recess of the lens holder 300 between the base 200 and the liquid lens module 500 so that the gas is discharged toward the outside. At this time, the gas may be generated by the adhesive 600. In more detail, the gas may be generated during the curing of the adhesive 600 after application.

The recess may comprise a plurality of recesses. The recess may comprise two recesses. The recess may comprise two recesses symmetric about the optical axis. In the first exemplary embodiment, two recesses may be spaced apart from four second grooves 320. At this time, the adhesive applied to the four second grooves 320 moves along any one or more of the inner circumferential surface of the lens holder 300 and the outer circumferential surface of the lens module 400, but the recess may not be sealed.

In the first exemplary embodiment, a first space 10 may be formed by a base 200, a lens holder 300, and a lens module 400. That is, the first space 10 may be formed between the base 200, the lens holder 300, and the lens module 400. In addition, a second space 20 may be formed by the liquid lens module 500, the lens holder 300, and the lens module 400. That is, a second space 20 may be formed between the liquid lens module 500, the lens module 400, and the lens holder 300. At this time, the first groove 310 may connect the first space 10 and the second space 20. The recess may connect the first space 10 and the second space 20. Through this, a path can be formed in the order of the first space 10, the second space 20, the side space of the liquid lens module 500, the upper space of the liquid lens module 500 and a hole 811 of the cover 800.

The lens holder 300 may comprise a second groove 320. Hereinafter, the second groove 320 may be used as a groove. The second groove 320 may be a bonding tank to which a bond is applied. The second groove 320 may be formed on the lower surface of the lens holder 300. The second groove 320 may be formed in the inner circumferential surface of the lens holder 300. The second groove 320 may be formed in an inner side surface of the lens holder 300. The second groove 320 may extend from the lower surface of the lens holder 300 and may be spaced apart from the upper surface of the lens holder 300. Accordingly, the second groove 320 may be distinguished from the first groove 310 extending from the lower surface to the upper surface of the lens holder 300. An adhesive may be applied to the second groove 320. An adhesive is disposed in the second groove 320 so that the lens holder 300 can be coupled with the lens module 400. The adhesive applied to the second groove 320 may move along the inner circumferential surface of the lens holder 300 and the outer circumferential surface of the lens module 400. However, the adhesive may move only to the extent that the first groove 310 is not sealed. The adhesive may be disposed between the outer circumferential surface of the lens module 400 and the lens holder 300. A gap or a path formed be formed in at least a portion of the first groove 310 of the lens holder 300 without an adhesive. The second groove 320 may comprise a chamfered surface 321. The chamfered surface 321 may be disposed at the lower end of the second groove 320. The chamfered surface 321 may obliquely connect the inner circumferential surface of the second groove 320 and the lower surface of the lens holder 300. The chamfered surface 321 of the second groove 320 may be obliquely disposed at a different inclination angle from the inner circumferential surface of the second groove 320.

The second groove 320 may comprise a plurality of grooves. The second groove 320 may comprise four grooves. The second groove 320 may comprise four grooves symmetrical with respect to the optical axis. The four grooves may be arranged on the inner circumferential surface of the lens holder 300 so as to be spaced at equal intervals.

In the first exemplary embodiment the lens holder 300 may comprise a lower surface facing the upper surface of the base 200. An adhesive 600 may be adhered to the upper surface of the base 200 and the lower surface of the lens holder 300. The first groove 310 of the lens holder 300 may extend from the lower surface of the lens holder 300 to the upper surface of the lens holder 300. Through this, the first groove 310 may form a through hole in the vertical direction (optical axis direction) between the lens holder 300 and the lens module 400.

The lens holder 300 may comprise a stepped portion 330. The stepped portion 330 may be formed on an outer circumferential surface of the lens holder 300. The stepped portion 330 may be formed at the lower end of the lens holder 300. A lateral plate 820 of the cover 800 may be disposed at the stepped portion 330. However, the stepped portion 330 and the lateral plate 820 of the cover 800 may be spaced apart.

The lens holder 300 may comprise an upper surface disposed inside the sidewall 350. The upper surface of the lens holder 300 may comprise a first surface 341. A coupling portion 701 of the conductive member 700 may be disposed at the first surface 341 of the lens holder 300. The upper surface of the lens holder 300 may comprise a recessed portion 343 recessed from the first surface 341. The upper surface of the lens holder 300 may comprise a groove 344 recessed from the recessed portion 343. The lens holder 300 may comprise a groove 342 or a hole formed in the upper surface of the lens holder 300 adjacent to a partition wall 355. The groove 342 or hole of the lens holder 300 may be a space for accommodating the adhesive overflowing the partition 355.

The lens holder 300 may comprise a sidewall 350. The side wall 350 may form an outer circumferential surface of the lens holder 300. The side wall 350 may protrude from the upper surface of the lens holder 300. An electrically conductive material 750 may be disposed inside the sidewall 350.

The lens holder 300 may comprise a partition wall 335. The partition wall 335 may connect the upper surface of the lens holder 300 and the side wall 350. The partition wall 335 may comprise a plurality of partition walls. An electrically conductive material 750 may be disposed between the multiple partition walls. The plurality of partition walls may partition the space between the lens holder 300 and the liquid lens module 500 into a plurality of areas. Through this, the terminal 530 and the conductive member 700 of the liquid lens module 500 may be electrically conducted in each of the plurality of areas. The partition wall 335 may be disposed between neighboring terminals of the plurality of terminals of the conductive member 700.

The lens holder 300 may comprise an extension portion 360. The extension portion 360 may extend below the lower surface of the lens holder 300. The extension portion 360 may extend to the upper surface of the substrate 100. However, the lower surface of the extension portion 360 and the upper surface of the substrate 100 may be spaced apart. The conductive member 700 may be disposed on an outer surface of the extension portion 360.

The lens holder 300 may comprise a groove 390. The groove 390 may be a groove for accommodating an adhesive therein. The liquid lens module 500 and/or the lens module 400 may be fixed to the lens holder 300 by an adhesive disposed in the groove 390. The groove 390 may be formed in the upper surface of the lens holder 300. The groove 390 may be formed in each of the four corners of lens holder 300. An adhesive may be disposed in the groove 390.

The camera device may comprise a lens module 400. The lens module 400 may be disposed in the lens holder 300. The lens module 400 may be disposed inside the lens holder 300. The lens module 400 may be coupled to the lens holder 300.

The lens module 400 may comprise a barrel 410. The barrel 410 may be a lens barrel. The barrel 410 may accommodate the lens therein. The inner circumferential surface of the barrel 410 may be formed in a shape corresponding to the inner circumferential surface of the lens. The barrel 410 may be formed of an insulating material.

The lens module 400 may comprise a lens. The lens may be a solid lens. The lens may be a plastic lens. The lens may comprise a plurality of lenses. Some of the lenses may be disposed in a first group lens area 420, and some of the lenses may be disposed in a second group lens area 430. The first group lens area 420 may be spaced apart from the second group lens area 430. For example, three lenses may be disposed in the first group lens area 420 and two lenses may be disposed in the second group lens area 430.

The lens module 400 may comprise a hole 440. The hole 440 may be a liquid lens accommodating portion. The liquid lens module 500 may be disposed in the hole 440. The hole 440 may be formed to have a height higher than that of the liquid lens module 500 by a predetermined size. In addition, the hole 440 may penetrate the liquid lens module 500 in the horizontal direction. Through this, the liquid lens module 500 may be inserted into the hole 440 of the lens module 400 in the horizontal direction.

The lens module 450 may comprise an adhesive hole 450. The adhesive hole 450 may be connected to the hole 440. The adhesive hole 450 may be formed to penetrate a portion of the upper plate of the barrel 410 of the lens module 450. An adhesive may be injected between the lens module 450 and the liquid lens module 500 through the adhesive hole 450.

The camera device may comprise a liquid lens module 500. The liquid lens module 500 may be combined with the lens module 400. The liquid lens module 500 may be spaced apart from the lens holder 300. The liquid lens module 500 may be aligned with the lens and the image sensor 110. The liquid lens module 500 may be inserted into and fixed to the lens module 400 in a horizontal direction.

The camera device may comprise a liquid lens unit. The liquid lens unit may comprise a liquid lens 510, a holder 520, and a terminal 530. The liquid lens unit may be combined with the barrel 410 and comprise the liquid lens 510.

The liquid lens module 500 may comprise a liquid lens 510. The liquid lens 510 may be disposed in the holder 520. The liquid lens 510 may be disposed between the multiple lenses. The liquid lens 510 may be disposed between the first group lens area 420 and the second group lens area 430.

The liquid lens 510 whose focal length is adjusted in response to the driving voltage may receive an operating voltage through the electrode. The upper electrode may have the same angular distance and may comprise four individual terminals disposed at different directions. When an operating voltage is applied through the upper electrode and the lower electrode, the interface between the conductive liquid and the non-conductive liquid formed in the lens area may be deformed. The upper electrode may be an 'upper terminal'. The lower electrode may be a 'lower terminal'. The liquid lens 510 may be spaced apart from the solid lens. In the first exemplary embodiment, an epoxy may be applied through a space separating the liquid lens 510 and the solid lens, and active alignment of the liquid lens 510 may be performed.

One side of the liquid lens 510 may receive a voltage from the upper electrode. The other side of the liquid lens 510 may receive a voltage from the lower electrode. The liquid lens 510 may be described as an equivalent circuit as a capacitor between four individual electrodes and a common electrode. Here, the plurality of capacitors included in the equivalent circuit may have a small capacitance of about 200 pF level. In the first exemplary embodiment, the upper electrode of the liquid lens 510 may be an individual terminal and the lower electrode may be a common terminal. Alternatively, the upper electrode of the liquid lens 510 may be a common terminal and the lower electrode may be an individual terminal. The liquid lens 510 may deform an interface formed between the conductive liquid and the non-conductive liquid by the current and/or voltage applied to the upper electrode and the lower electrode. In this way, any one or more of an AF function and an OIS function may be performed.

The liquid lens 510 may comprise a terminal 511. The terminal 511 may comprise a plurality of terminals. The terminal 511 may comprise four individual terminals formed at four corners of the upper surface of the liquid lens 510, and four common terminals formed at four corners of the lower surface of the liquid lens 510. The individual terminals may be individual electrodes. The common terminal may be a common electrode.

The liquid lens module 500 may comprise a holder 520. Holder 520 may be a liquid lens holder. The lower surface of the holder 520 may be disposed higher than the upper surface of the lens holder 300. The liquid lens 510 may be disposed inside the holder 520. The holder 520 may comprise a hole 521. The hole 521 may penetrate the holder 520 in the optical axis direction. The liquid lens 510 may be disposed in the hole 521.

The holder 520 may comprise a first groove 522. The first groove 522 may be formed on the upper surface of the holder 520. A portion of the upper terminal 531 and/or the first lower terminal 532-1 may be disposed in the first groove 522. The first groove 522 may be formed in a shape corresponding to a portion of the upper terminal 531 and/or the first lower terminal 532-1. The holder 520 may comprise a second groove 523. The second groove 523 may be formed on the side surface of the holder 520. A portion of the upper terminal 531 and/or the first lower terminal 532-1 may be disposed in the second groove 523. The second groove 523 may be formed in a shape corresponding to a portion of the upper terminal 531 and/or the first lower terminal 532-1. Holder 520 may comprise an adhesive groove. The adhesive groove of the holder 520 may be formed in any one or more of an upper surface and a lower surface of the holder 520. An adhesive may be disposed in the adhesive groove of the holder 520 so that the terminal 530 may be fixed to the holder 520.

The liquid lens module 500 may comprise a terminal 530. The terminal 530 may be a first terminal. The terminal 530 may be connected to the liquid lens 510. The terminal 530 may be connected to the terminal 511 of the liquid lens 510. The terminal 530 may be disposed in the holder 520. The terminal 530 may be disposed on the side surface of the liquid lens module 500. At least a portion of the terminal 530 may be disposed on a side surface of the holder 520. The terminal 530 may be protruded from the side surface of the liquid lens module 500. The terminal 530 may be spaced apart from the conductive member 700. One end of the terminal 530 may be connected to the terminal 511 of the liquid lens 510, and the other end of the terminal 530 may be connected to the electrically conductive material 750. At this time, the other end of the terminal 530 may be disposed to be immersed in the electrically conductive material 750. A portion of the terminal 530 may be protruded from the holder 520. A portion of the terminal 530 may be spaced apart from the conductive member 700 and overlap with the conductive member 700 in a vertical direction. The vertical direction may be parallel to the optical axis direction.

In the first exemplary embodiment, the first terminal may comprise a first area electrically connected to the liquid lens 510 and a second area extending in a direction perpendicular to the optical axis direction on the side surface of the liquid lens unit and coupled to a conductor. In this case, the second terminal may comprise a first area being overlapped with the second area of the first terminal in the optical axis direction and coupled to the conductor. Here, the first terminal may be a terminal 530 of the liquid lens module 500 and the second terminal may be a conductive member 700 disposed in the lens holder 300. The first terminal may comprise an extension portion bent in the first area of the first terminal, and the second area of the first terminal may be bent in the extension portion. That is, the first terminal may comprise a structure bent in two stages. Here, the two-stage bending structure of the first terminal may correspond to a first coupling portion 531a, a second coupling portion 531b, and a connecting portion 531c. The second terminal (conductive member 700) may comprise an extension portion bent in the first area of the second terminal. The first area of the second terminal may be disposed on the upper surface of the lens holder 300, and the extension portion of the second terminal may be disposed on the side surface of the lens holder 300. An end of the extension portion of the second terminal may be soldered to the substrate 100. The second area of the first terminal may be spaced apart from the upper surface of the lens holder 300. The second area of the first terminal may be spaced apart from the first area of the second terminal and at least a portion of the conductor may be disposed therebetween. At this time, the conductor may be an electrically conductive material 750. The second area of the first terminal may be spaced apart from the first area of the second terminal in the optical axis direction. The first terminal may be disposed in the holder 520 to be electrically connected to the liquid lens 510.

The terminal 530 may comprise five terminals. At this time, three of the five terminals are disposed on the first side surface of the liquid lens module 500, and the remaining two terminals of the five terminals may be disposed on the second side surface opposite to the first side surface of the liquid lens module 500. At this time, the conductive member 700 may comprise five conductive members 700 corresponding to the five terminals.

The terminal 530 may comprise an upper terminal 531. The upper terminal 531 may be disposed on the upper surface and the outer side surface of the holder 520.

The upper terminal 531 may comprise a plurality of terminals. The upper terminal 531 may comprise four terminals. The four terminals of the upper terminal 531 may be connected to four individual terminals of the liquid lens 510, respectively. The upper terminal 531 may comprise a first portion disposed on the side surface of the holder 520 and a second portion extending outward from the first portion and connected to the electrically conductive material 750. The upper terminal 531 may comprise 1-1 to 1-4 terminals 531-1, 531-2, 531-3, and 531-4. The 1-1 and 1-2 terminals 531-1, 531-2 are disposed at one side of the holder 520, and the 1-1 and 1-4 terminals 531-3, 531-4 may be disposed on the other side of the holder 520.

In the first exemplary embodiment, each of the upper terminal 531 and the lower terminal 532 may comprise a first portion disposed on the side surface of the holder 520 and a second portion extending outward from the first portion and connected to the conductor. At this time, at least a portion of the conductor may be disposed between the second portion of each of the upper terminal 531 and the lower terminal 532 and the second terminal of the conductive member 700.

The upper terminal 531 may comprise: a first coupling portion 531a connected to the terminal 511 of the liquid lens 510; a second coupling portion 531b connected to the electrically conductive material 750; and connecting portion 531c for connecting the first coupling portion 531a and the second coupling portion 531b. The first coupling portion 531a is disposed on the upper surface of the holder 520, and the connecting portion 531c is disposed on the side surface of the holder 520, and the second coupling portion 531b may protrude from the side surface of the holder 520. The connecting portion 531c may form a right angle with the first coupling portion 531a and the second coupling portion 531b.

The terminal 530 may comprise a lower terminal 532. The lower terminal 532 may be disposed on the lower surface and the outer surface of the holder 520. The lower terminal 532 may connect four common terminals of the liquid lens 510. In the first exemplary embodiment, the lower terminal 532 can be used to remove the bridge and use it as an electrode connecting terminal.

The lower terminal 532 may comprise: a first lower terminal 532-1 disposed on the lower surface and/or the upper surface of the holder 520 and the outer side surface of the holder 520; and a second lower terminal 532-2 having the shape of a plate and coupled to the lower surface of the holder 520 and connecting the common terminal of the liquid lens 510 and the first lower terminal 532-1.

The first lower terminal 532-1 may comprise: a third coupling portion 532d disposed on the lower surface of the holder 520 and connected to the second lower terminal

532-2; a fourth coupling portion 532e extending from the third coupling portion 532d and disposed on an outer surface of the holder 520 and partially protruding outward and electrically connected to a conductive member 700; and a connecting portion 532f connecting the third coupling portion 532d and the fourth coupling portion 532e. A portion of the first lower terminal 532-1 may comprise a hook shape.

The second lower terminal 532-2 may comprise: a first coupling portion 532a connected to the terminal 511 of the liquid lens 510; a second coupling portion 532b connected to the upper terminal 531; and a connecting portion 532c for connecting the first coupling portion 532a and the second coupling portion 532b.

In the liquid lens 510, a semi-circular shape such as a lens or a spherical curvature may be formed in a state in which two kinds of liquids are not mixed therein. Four or more exposed terminals 511 may be formed on the outer side of the liquid lens 510 to control the interface surface curvature. The first coupling portion 531a for connecting the upper terminal of the liquid lens 510 may be formed inside in the shape of a plane. In order to connect the first coupling portion 531a, which is formed separately in a plane, to the external electrode, the terminal may be connected to the side surface. The first coupling portion 531a that is electrically conducted with the inner liquid lens 510 and the second coupling portion 531b for external electrical conduction may be connected and may have a bent shape. A holder 520, which is an injection molded product for fixing the liquid lens 510 and the terminal 530 and fixing the liquid lens 510 and the terminal 530, may be provided. The holder 520 may be structurally wrapped by the upper terminal 531, and a space for applying an electrically conductive bond may be formed at a portion of the first coupling portion 531a. A second lower terminal 532-2, which is a metal terminal, may be provided to electrically conduct with the lower terminal of the liquid lens 510. The second lower terminal 532-2 is assembled to the lower side of the holder 520, which is an injection molded product, and is adhered by bonding. An electrically conductive bond may be applied to a space formed in a planar electrode portion to be electrically coupled to the liquid lens 510. A first lower terminal 532-1 having the side surface and the lower side exposed to the holder 520 in red may be provided in order to connect the second lower terminal 532-2 with an external electrode. A space is formed in the second lower terminal 532-2 in a portion facing the first lower terminal 532-1 in a plane, and thereby the second lower terminal 523-2 and the first lower terminal 532-1 can be electrically connected to each other through application of an electrically conductive bond.

Through the structure of the liquid lens module 500 of the first exemplary embodiment, it is possible to simplify the process and reduce the investment cost by reducing the number of components. In addition, it is possible to reduce the material cost by reducing the number of components. Component integration allows compact height implementations. The strength of the terminal can be improved compared to the prior art. The electrode connection with the outside can be formed on the side surface without forming an electrical connecting portion separately. Therefore, size reduction in the planar direction may become possible.

Referring to FIG. 9, the liquid lens module 500 according to the first exemplary embodiment may be assembled through the following procedure. First, the holder 520 in a state where the upper terminal 531 and the first lower terminal 532-1 are coupled is prepared in a flipped state. While the holder 520 is in a flipped state, the liquid lens 510 coupled to the holder 520 may be disposed such that the size of the upper opening is smaller than that of the lower opening. Thereafter, a conductive adhesive is applied to the first coupling portion 531a of the upper terminal 531, and the liquid lens 510 is also inserted and coupled in a flipped state. At this time, the first coupling portion 531a of the upper terminal 531 and the terminal of the upper surface of the liquid lens 510 are electrically connected. Thereafter, the second lower terminal 532-2 is coupled to the holder 520 and the liquid lens 510. The terminal of the lower surface of the liquid lens 510 and the second lower terminal 532-2 may be electrically connected by a conductive adhesive. In addition, in this process, the first lower terminal 532-1 and the second lower terminal 532-2 may be electrically connected at the same time. Through the aforementioned process, the assembly of the liquid lens module 500 may be completed.

The camera device may comprise an adhesive 600. The adhesive 600 may couple the lens holder 300 and the base 200. The adhesive 600 may be disposed at any one or more place between the upper surface of the base 200 and the lens holder 300, and between the side surface of the base 200 and the lens holder 300. The adhesive 600 may seal between the base 200 and the lens holder 300. Therefore, the gas generated during the curing of the adhesive 600 may be discharged through the first groove 310 of the lens holder 300 without being discharged between the base 200 and the lens holder 300. In the first exemplary embodiment, although the adhesive 600 is configured to adhere the lens holder 300 and the base 200, an adhesive to adhere the lens module 400 and the lens holder 300, and an adhesive for adhering the holder 520 and the lens holder 300 may be further provided in addition to the present adhesive 600.

The camera device may comprise a conductive member 700. The conductive member 700 may comprise a terminal. The terminal of the conductive member 700 may be a second terminal. The conductive member 700 may be disposed in the lens holder 300. The conductive member 700 may electrically connect the substrate 100 and the liquid lens module 500. The conductive member 700 may be spaced apart from the cover 800. The conductive member 700 may be integrally formed.

The conductive member 700 may comprise a plurality of conductive members 700. The conductive member 700 may comprise five conductive members. The conductive member 700 may comprise first to fifth conductive members 700-1, 700-2, 700-3, 700-4, and 700-5. The five conductive members may be electrically connected to five first terminals, respectively. Here, the five first terminals may comprise four upper terminals and one common terminal. The conductive member 700 may comprise a plurality of terminals. In a modified example, the plurality of terminals of the conductive member 700 may all be disposed on one side of the lens holder 300.

The conductive member 700 may comprise a coupling portion 701. The coupling portion 701 may be in contact with electrically conductive material 750. The electrically conductive material 750 may be a conductive material. The electrically conductive material 750 may be a conductor. The coupling portion 701 may form the same plane as the upper surface of the lens holder 300. The coupling portion 701 may be overlapped with the terminal 530 of the liquid lens module 500 in the vertical direction. The electrically conductive material 750 may connect a first terminal, which is a terminal 530 of the liquid lens module 500, and a second terminal, which is a conductive member 700 disposed in the lens holder 300. The conductor may be coupled to the first terminal and the second terminal.

The conductive member 700 may comprise: a first terminal disposed in the holder 520 and connected to the liquid lens 510; a second terminal disposed in the lens holder 300 and connected to the substrate 100; and an electrically conductive material 750 connecting the first terminal and the second terminal. That is, the conductive member 700 may be used as a concept which comprises the terminal 530 of the liquid lens module 500. Although the electrically conductive material 750 has been described as one component of the conductive member 700, the electrically conductive material 750 may be described as a separate component from the conductive member 700.

The camera device may comprise an electrically conductive material 750. The electrically conductive material 750 may be disposed between the terminal 530 of the liquid lens module 500 and the conductive member 700. The electrically conductive material 750 may connect the terminal 530 of the liquid lens module 500 and the conductive member 700. An electrically conductive material 750 may be disposed in a portion of the conductive member 700. The electrically conductive material 750 may comprise any one or more of solder and a conductive adhesive. The electrically conductive material 750 may comprise a silver (Ag) epoxy. The electrically conductive material 750 may be disposed between the multiple partitions 355 of the lens holder 300.

In a first exemplary embodiment, the lower surface of the liquid lens module 500 may be disposed above the lens holder 300. At this time, the electrically conductive material 750 connecting the terminal 530 of the liquid lens module 500 and the conductive member 700 may be disposed on the lens holder 300. An adhesive 600 may be disposed between the lower surface of lens holder 300 and the upper surface of base 200. In one example, the lens holder 300 may comprise a groove formed in the upper surface of the lens holder 300. At this time, a portion of the terminal 720 of the conductive member 700 may be disposed in the lower surface of the groove of the lens holder 300, and the electrically conductive material 750 may be disposed in the groove of the lens holder 300.

In a first exemplary embodiment, an immersion structure in which a part of the terminal 530 of the liquid lens module 500 is immersed in the electrically conductive material 750 may be formed. Through this, electrical connection may be possible to the terminal 530 of the liquid lens module 500 without an external pressure. Meanwhile, a stable resistance may be secured by increasing the contact area of the electrically conductive material 750 between the terminal 530 of the liquid lens module 500 and the conductive member 700. By adopting a bond tank structure in the lens holder 300 and applying a silver (Ag) epoxy to the bond tank for a stable application thereof and for preventing a short failure caused by a silver (Ag) epoxy bridge. Electrical connection through a silver (Ag) epoxy may prevent deterioration of the characteristics of the liquid lens 510 due to high heat.

The conductive member 700 may comprise a conductive layer 710 integrally formed on the surface of the lens holder 300. At this time, the conductive layer 710 may be formed on the surface of the lens holder 300 through a molded interconnection device (MID) technology. The conductive layer 710 is extended along the upper surface of the lens holder 300 and the side surface of the lens holder 300, and thereby one end is connected to the substrate 100 and the other end may be connected to the terminal 530 of the liquid lens module 500.

In the modified example, the conductive layer 710 formed through the MID technology in the first exemplary embodiment may be changed to the terminal 720 formed through insert injection. The conductive member 700 may comprise a terminal 720 integrally formed in the lens holder 300 through insert ejection. The terminal 720 may have a width at least partially different from other portions. The terminal 720 may comprise a plurality of terminals. The terminal 720 may comprise five terminals.

The camera device may comprise a cover 800. The cover 800 may cover the lens holder 300. The lens holder 300 may comprise a protruded portion that is extended from the upper surface of the lens holder 300 toward the outer side of the holder 520. An electrically conductive adhesive may be disposed between the upper surface of the lens holder 300 and the protruded portion of the lens holder 300. At this time, the electrically conductive adhesive may comprise an electrically conductive material 750. In a portion of the second space 20 an adhesive for fixing the holder 520 to the lens holder 300 and an electrically conductive adhesive is disposed, and a gap or a path may be formed in the remaining portion of the second space 20. The cover 800 may be coupled with the base 200.

The cover 800 can accommodate the lens holder 300 therein. The cover 800 may form an outer appearance of the camera device. The cover 800 may have a hexahedron shape with the lower surface open. The cover 800 may be non-magnetic material. The cover 800 may be formed of a metal material. The cover 800 may be formed of a metal plate. The cover 800 may be connected to the ground portion of the substrate 100. Through this, the cover 800 may be grounded. The cover 800 may shield electromagnetic interference (EMI). In this case, the cover 800 may be referred to as an 'EMI shield can'.

The cover 800 may comprise an upper plate 810 and a lateral plate 820. The cover 800 may comprise an upper plate 810 comprising a hole 811 and a lateral plate 820 extending downward from the upper plate 810.

In the first exemplary embodiment, a gas discharge path may be formed in between the lens module 400 and the hole 811 of the cover 800 through the lower surface of the liquid lens module 500, the side surface of the liquid lens module 500, and the upper surface of the liquid lens module 500. That is, the gas moved around the liquid lens module 500 may be discharged through the hole 811 between the lens module 400 and the upper plate 810 of the cover 800.

Hereinafter, a configuration of a camera device according to a second exemplary embodiment will be described with reference to the drawings.

Figure 23:
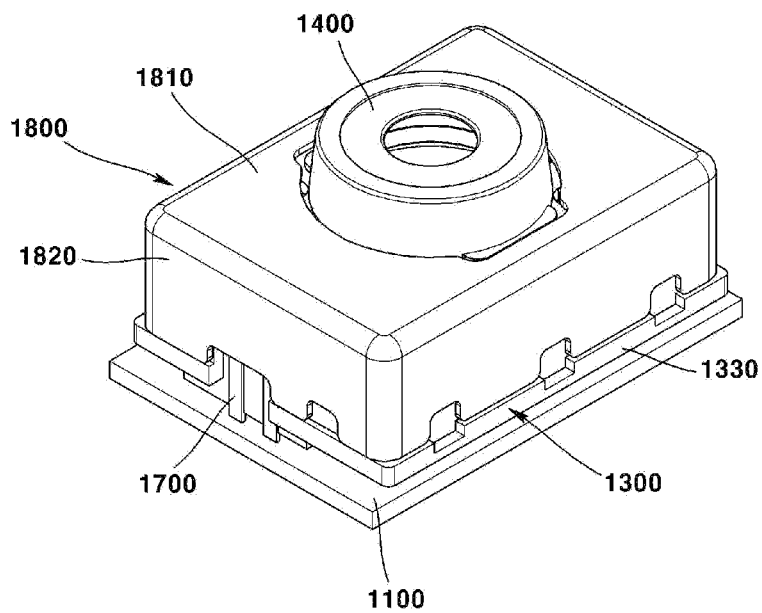
FIG. 23 is a perspective view of a camera device according to a second exemplary embodiment.
Figure 24:
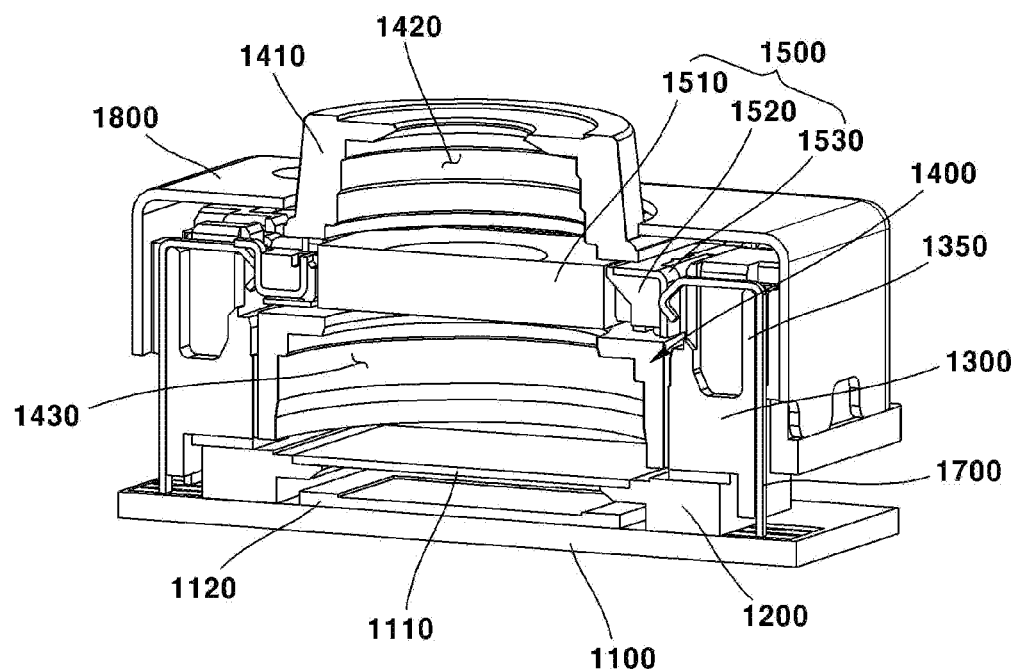
FIG. 24 is a cross-sectional perspective view of the camera device according to the second exemplary embodiment.
Figure 25:
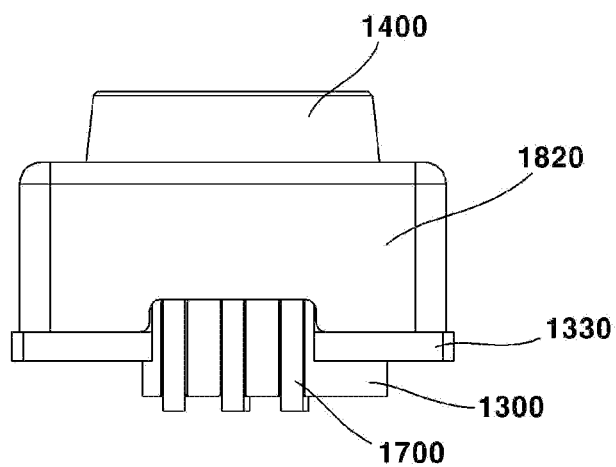
FIG. 25 is a side view of a partial configuration of the camera device according to the second exemplary embodiment.
Figure 26:
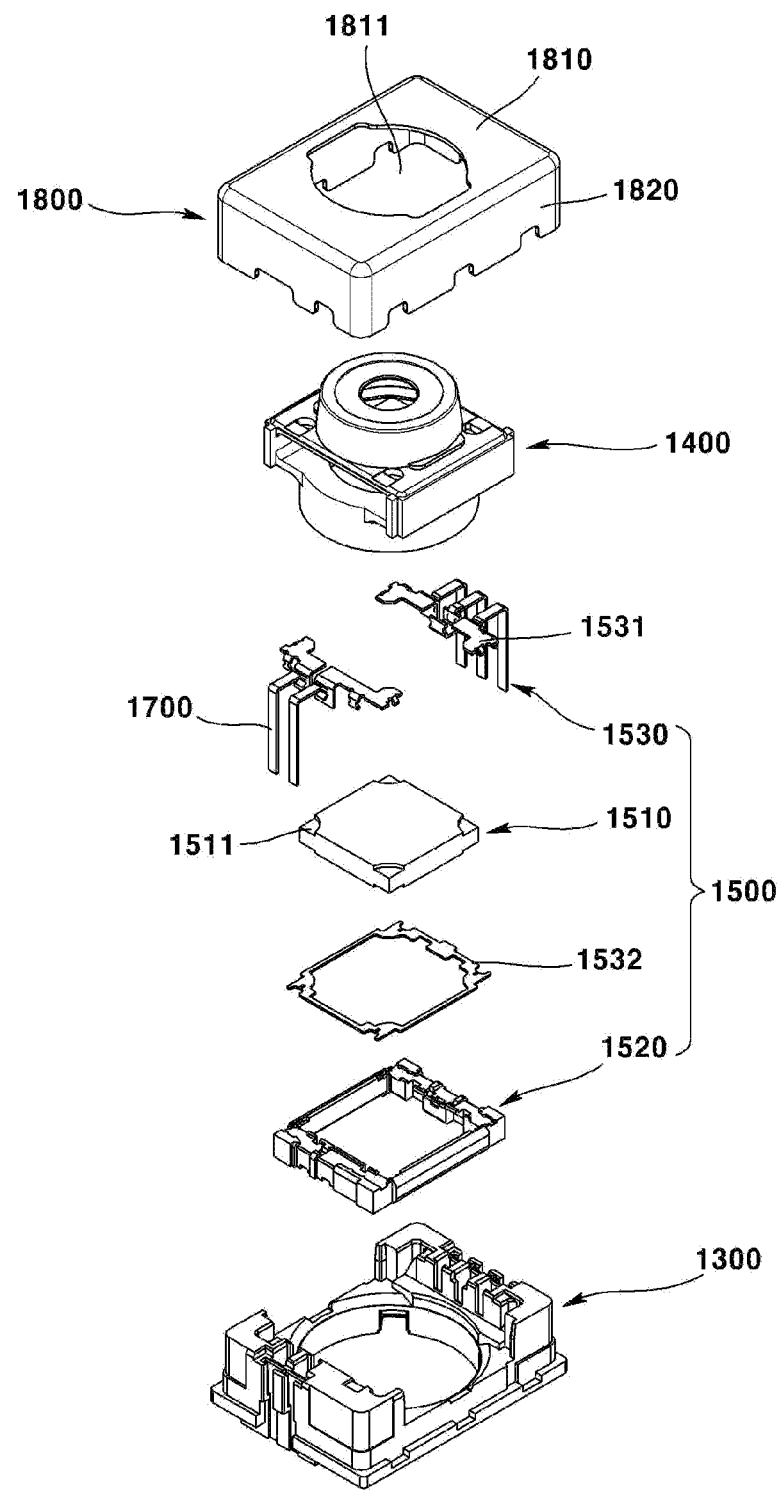
FIG. 26 is an exploded perspective view of a partial configuration of the camera device according to the second exemplary embodiment.
Figure 27:
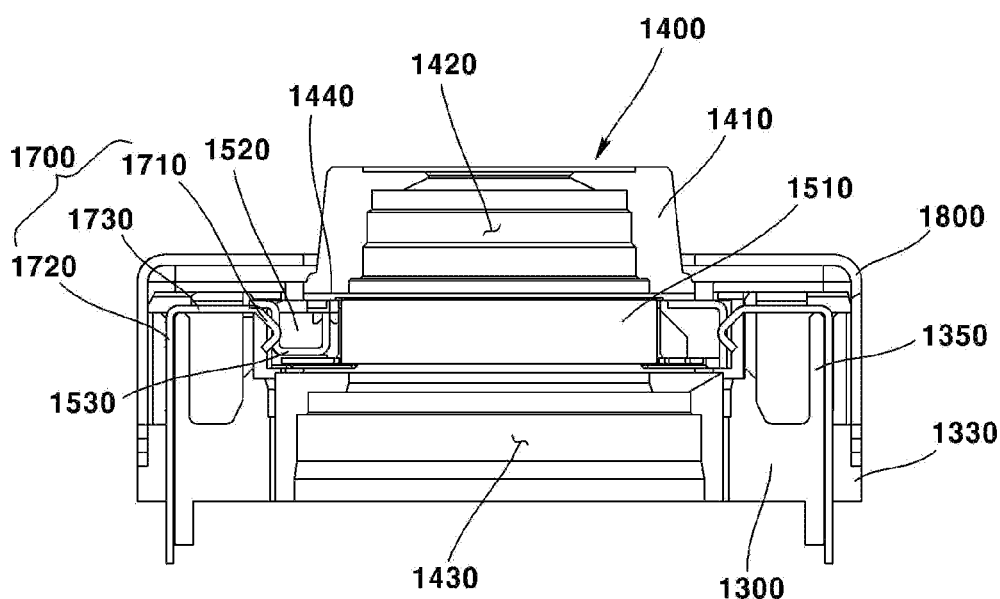
FIG. 27 is a cross-sectional view of a partial configuration of the camera device according to the second exemplary embodiment.
Figure 28:
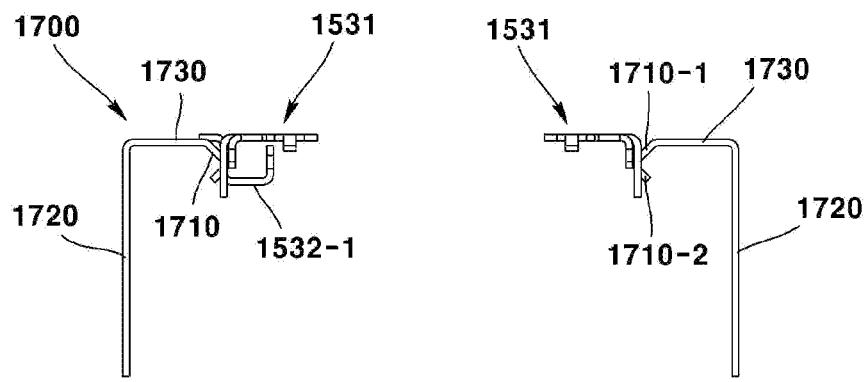
FIG. 28 is a side view of a terminal of a liquid lens module and a conductive member of the camera device according to the second exemplary embodiment.
Figure 29:
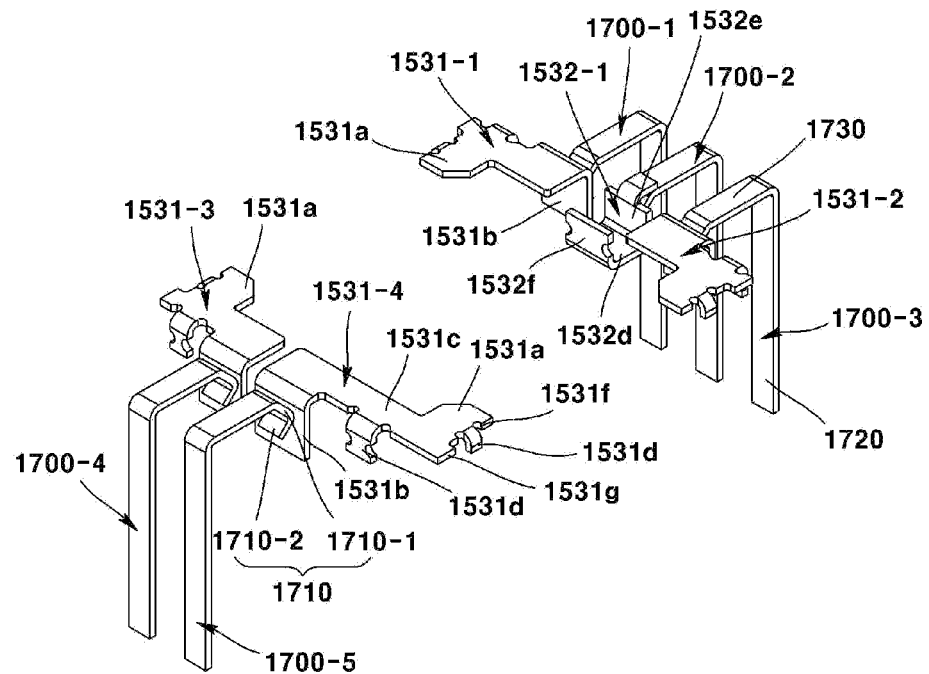
FIG. 29 is a perspective view of the terminal of the liquid lens module and the conductive member of the camera device according to the second exemplary embodiment.
Figure 30:
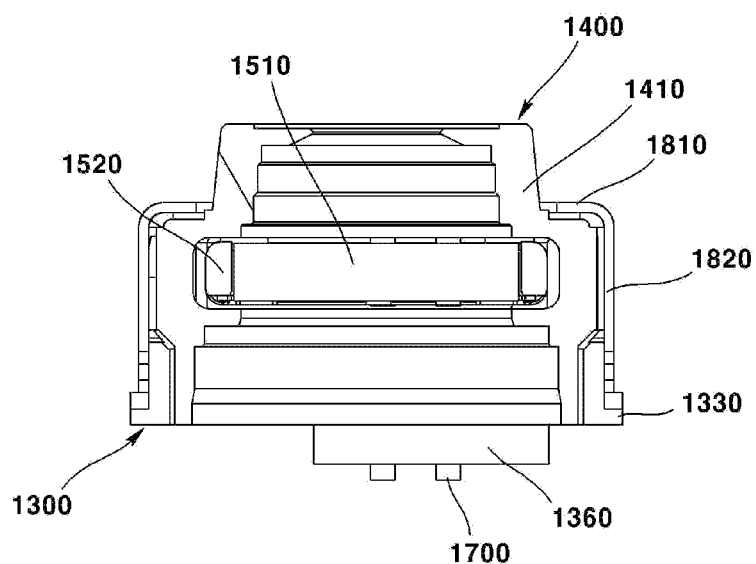
FIG. 30 is a cross-sectional view of a partial configuration of the camera device according to the second exemplary embodiment viewed from a different direction than FIG. 27.
Figure 31:
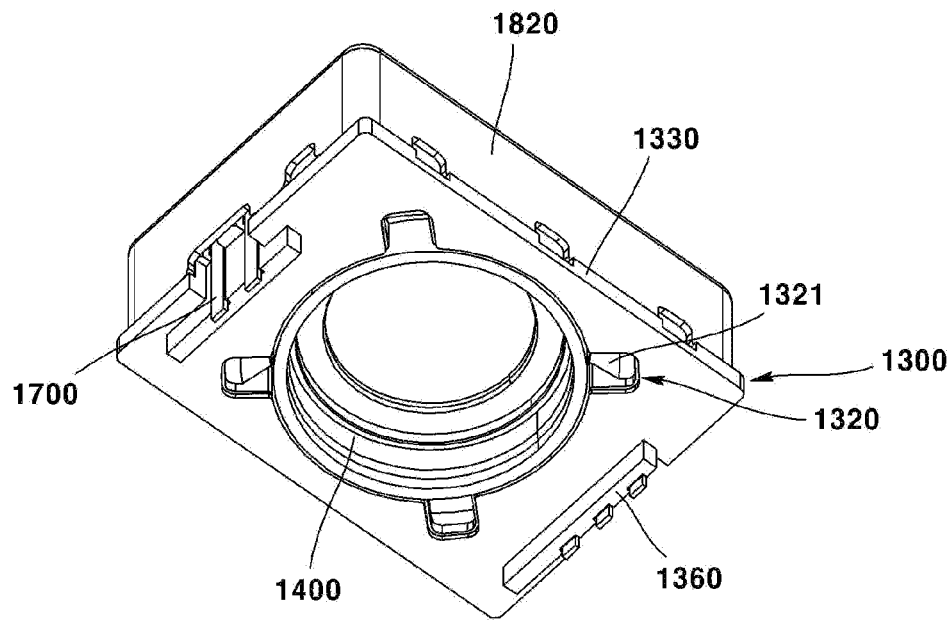
FIG. 31 is a bottom perspective view of a partial configuration of the camera device according to the second exemplary embodiment.
Figure 32:
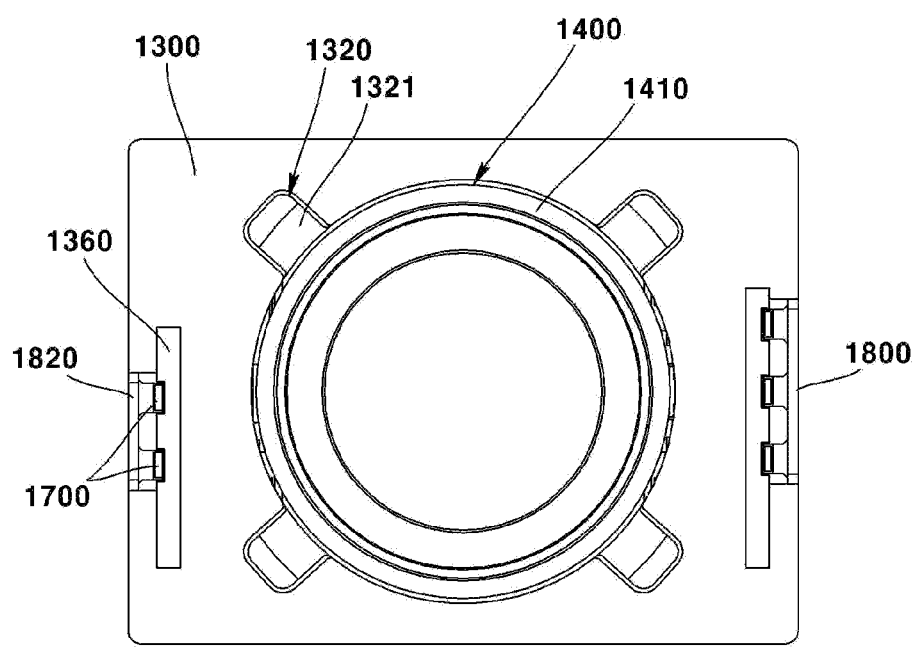
FIG. 32 is a bottom view of a partial configuration of the camera device according to the second exemplary embodiment.
Figure 33A:
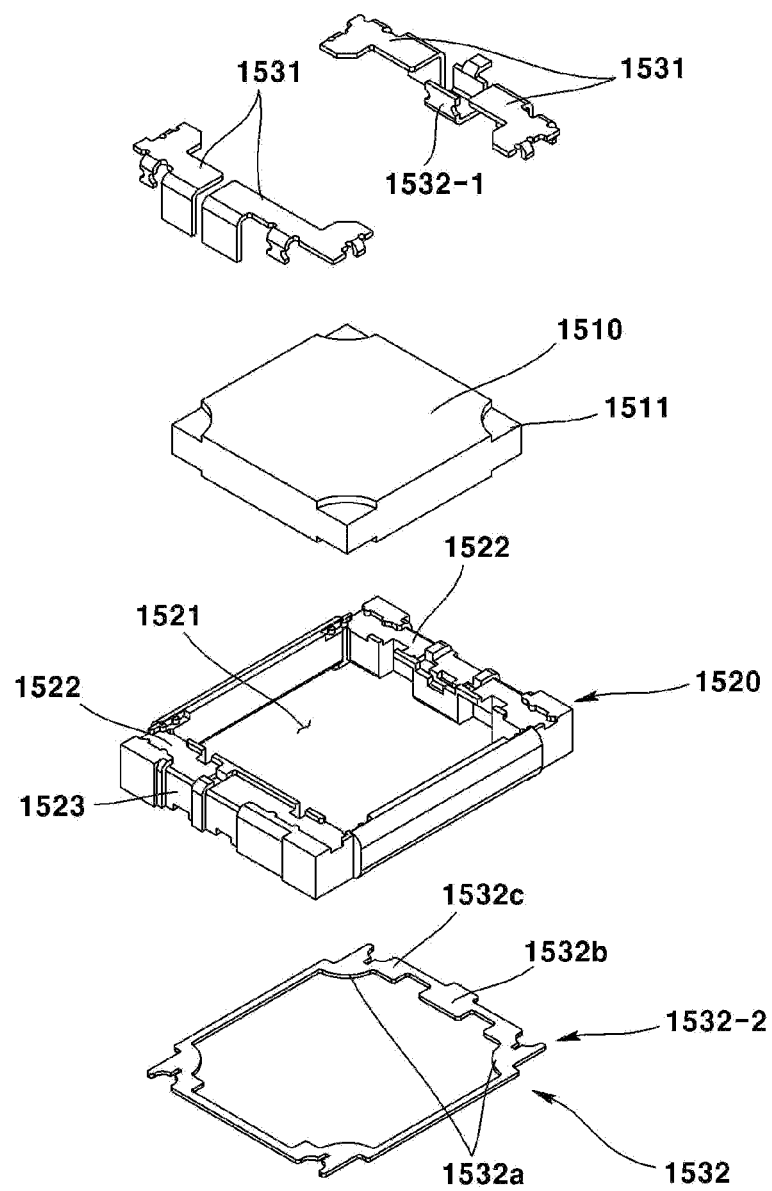
FIG. 33a is an exploded perspective view of a partial configuration of the camera device according to the second exemplary embodiment.
Figure 33B:
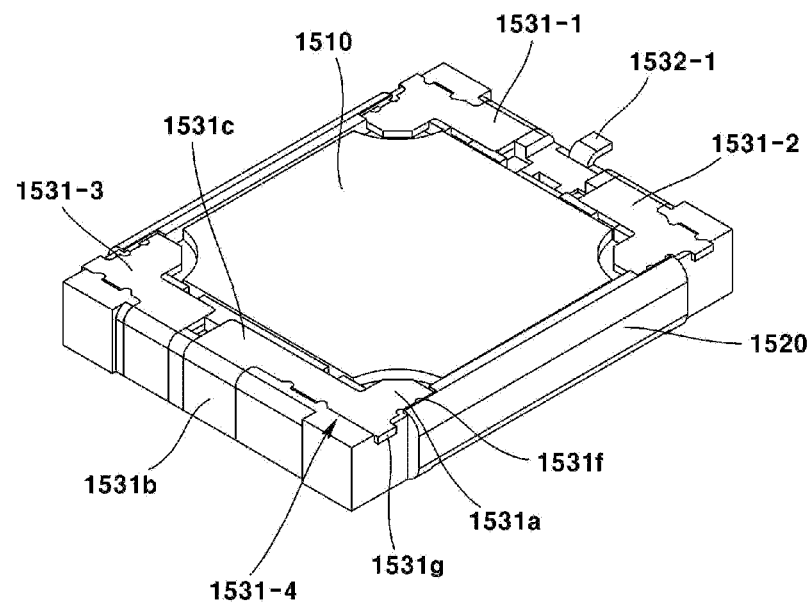
FIG. 33b is a perspective view of the liquid lens module according to the second exemplary embodiment.
Figure 33C:
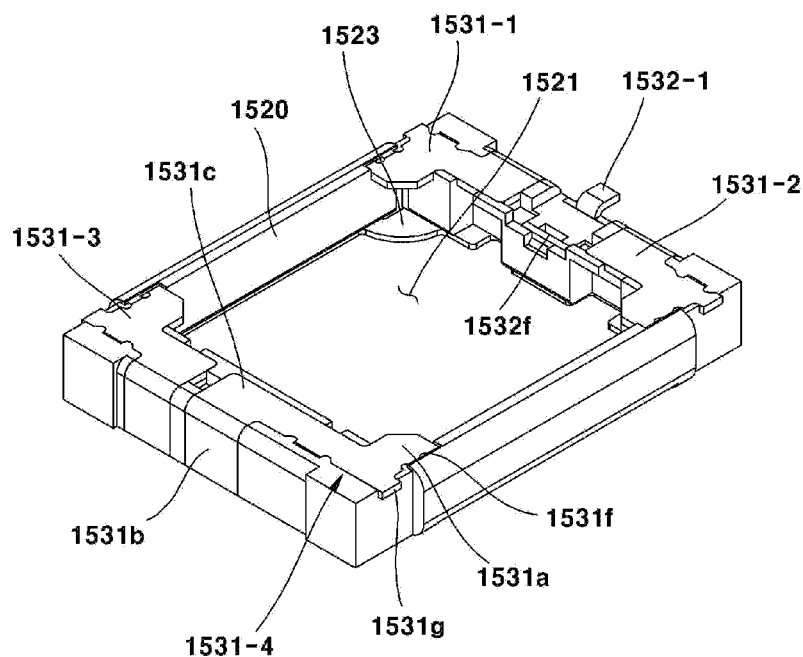
FIG. 33c is a perspective view of the liquid lens module of FIG. 33b, in which the liquid lens thereof is omitted.
Figure 33D:
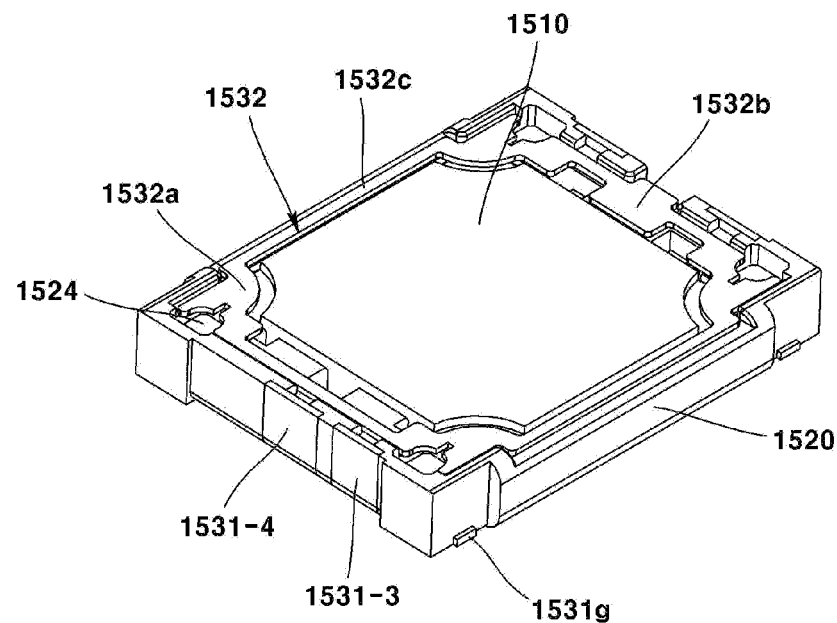
FIG. 33d is a bottom perspective view of the liquid lens module according to the second exemplary embodiment.
Figure 33E:
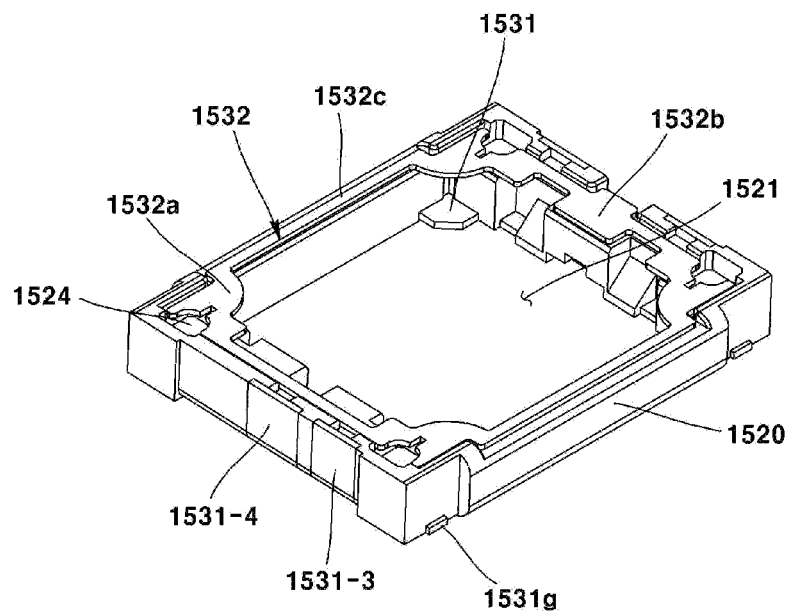
FIG. 33e is a perspective view of the liquid lens module of FIG. 33d, in which the liquid lens thereof is omitted.
Figure 34:
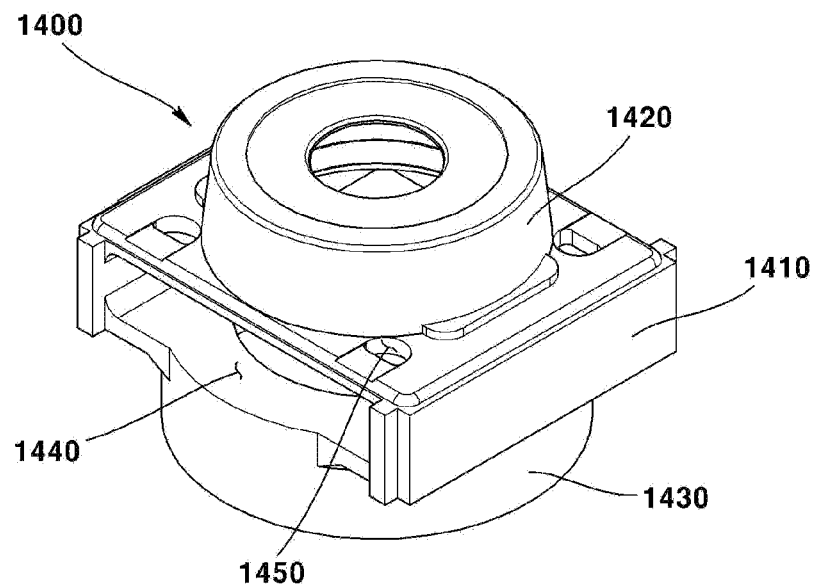
FIG. 34 is a perspective view of a lens module of the camera device according to the second exemplary embodiment.
Figure 35:
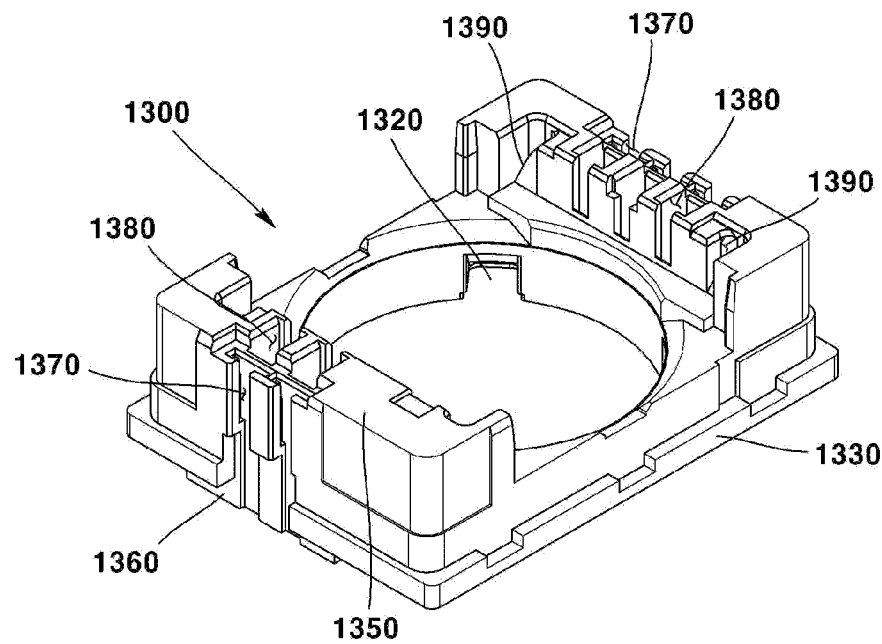
FIG. 35 is a perspective view of a lens holder of the camera device according to the second exemplary embodiment.
Figure 36:
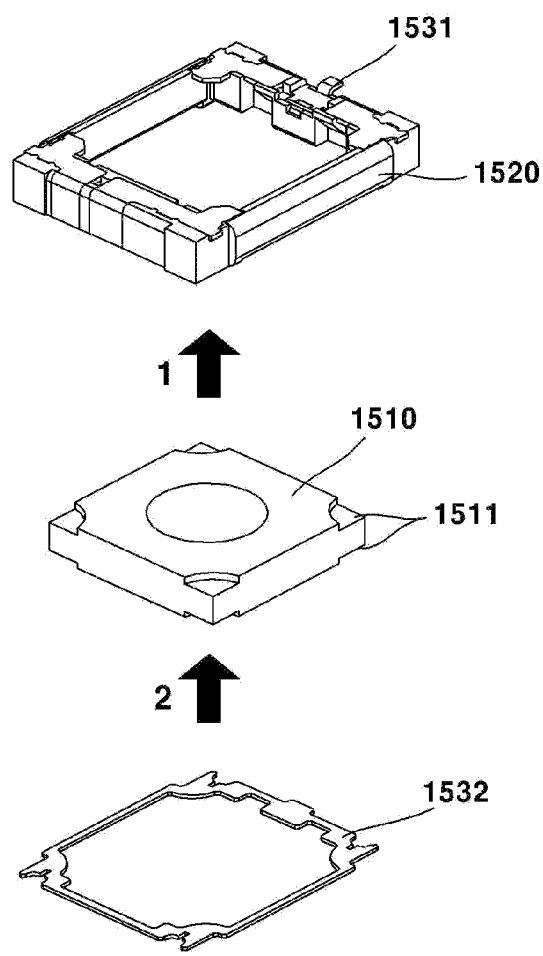
FIG. 36 is a diagram illustrating a process of assembling the liquid lens module according to the second exemplary embodiment.
Figure 37:
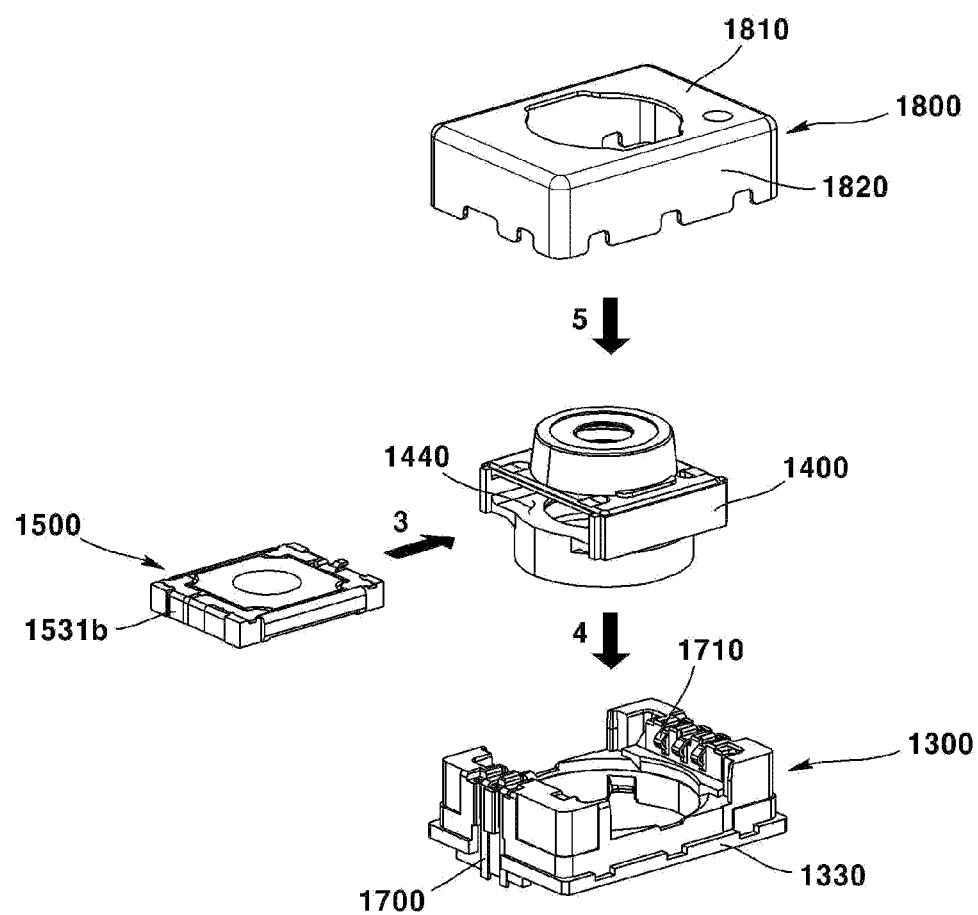
FIG. 37 is a diagram illustrating an assembly process of the camera device according to the second exemplary embodiment.

FIG. 23 is a perspective view of a camera device according to a second exemplary embodiment; FIG. 24 is a cross-sectional perspective view of the camera device according to the second exemplary embodiment; FIG. 25 is a side view of a partial configuration of the camera device according to the second exemplary embodiment; FIG. 26 is an exploded perspective view of a partial configuration of the camera device according to the second exemplary embodiment; FIG. 27 is a cross-sectional view of a partial configuration of the camera device according to the second exemplary embodiment; FIG. 28 is a side view of a terminal of a liquid lens module and a conductive member of the camera device according to the second exemplary embodiment; FIG. 29 is a perspective view of the terminal of the liquid lens module and the conductive member of the camera device according to the second exemplary embodiment; FIG. 30 is a cross-sectional view of a partial configuration of the camera device according to the second exemplary embodiment viewed from a different direction than FIG. 27; FIG. 31 is a bottom perspective view of a partial configuration of the camera device according to the second exemplary embodiment; FIG. 32 is a bottom view of a partial configuration of the camera device according to the second exemplary embodiment; FIG. 33a is an exploded perspective view of a partial configuration of the camera device according to the second exemplary embodiment; FIG. 33b is a perspective view of the liquid lens module according to the second exemplary embodiment; FIG. 33c is a perspective view of the liquid lens module of FIG. 33b, in which the liquid lens thereof is omitted; FIG. 33d is a bottom perspective view of the liquid lens module according to the second exemplary embodiment; FIG. 33e is a perspective view of the liquid lens module of FIG. 33d, in which the liquid lens thereof is omitted; FIG. 34 is a perspective view of a lens module of the camera device according to the second exemplary embodiment; FIG. 35 is a perspective view of a lens holder of the camera device according to the second exemplary embodiment; FIG. 36 is a diagram illustrating a process of assembling the liquid lens module according to the second exemplary embodiment; and FIG. 37 is a diagram illustrating an assembly process of the camera device according to the second exemplary embodiment.

The camera device may comprise a substrate 1100. The substrate 1100 may be a printed circuit board (PCB). The substrate 1100 may comprise an upper surface. An image sensor 1110, a base 1200, and a lens holder 1300 may be disposed on an upper surface of the substrate 1100. However, the upper surface of the substrate 1100 and the lens holder 1300 may be spaced apart. The substrate 1100 may comprise a terminal. The terminal of the substrate 1100 may be connected to a conductive member 1700.

The camera device may comprise an image sensor 1110. The image sensor 1110 may be disposed in the substrate 1100. The image sensor 1110 may be disposed in the substrate 1100. The image sensor 1110 may be disposed on the upper surface of the substrate 1100. The image sensor 1110 may be electrically connected to the substrate 1100. For example, the image sensor 1110 may be coupled to the substrate 1100 by surface mounting technology (SMT). As another example, the image sensor 1110 may be coupled to the substrate 1100 by flip chip technology. The image sensor 1110 may be disposed to coincide with the lens and the optical axis. That is, the optical axis of the image sensor 1110 and the optical axis of the lens may be aligned. The image sensor 1110 may convert light irradiated to the effective image area of the image sensor 1110 into an electrical signal. The image sensor 1110 may be any one of a charge coupled device (CCD), a metal oxide semiconductor (MOS), a CPD, and a CID.

The camera device may comprise a filter 1120. The filter 1120 may comprise an infrared filter. The infrared filter may block the infrared light incidenting onto the image sensor. The infrared filter can reflect infrared light. Alternatively, the infrared filter may absorb infrared light. The infrared filter may be disposed between a liquid lens module 1500 and the image sensor 1110. The infrared filter may be disposed in the hole of the base 1200.

The camera device may comprise a base 1200. The base 1200 may be disposed in the substrate 1100. The base 1200 may be disposed on the substrate 1100. The base 1200 may be disposed between the substrate 1100 and the lens holder 1300. The base 1200 may comprise a groove formed on the upper surface and in which the filter 1120 is disposed. A portion of the lower surface of the base 1200 may be recessed to form a space in which the image sensor 1110 is disposed.

The camera device may comprise a lens holder 1300. The lens holder 1300 may be disposed on the substrate 1100. The lens holder 1300 may be disposed on the base 1200. The lens holder 1300 may be disposed above the base 200. The lens holder 1300 may be coupled to the base 1200. The lens holder 1300 may be coupled to the lens module 1400. The lens holder 1300 may be disposed inside a cover 1800. The lens holder 1300 may be formed of an insulating material.

The lens holder 1300 may comprise a second groove 1320. Hereinafter, the second groove 1320 may be used as a groove. The second groove 1320 may be a bonding tank to which a bond is applied. The second groove 1320 may be formed on the lower surface of the lens holder 1300. The second groove 1320 may be formed in the inner circumferential surface of the lens holder 1300. The second groove 1320 may be formed in an inner side surface of the lens holder 1300. The second groove 1320 may extend from the lower surface of the lens holder 1300 and may be spaced apart from the upper surface of the lens holder 1300. An adhesive may be applied to the second groove 1320. An adhesive is disposed in the second groove 1320 so that the lens holder 1300 can be coupled with the lens module 1400. The adhesive applied to the second groove 1320 may move along the inner circumferential surface of the lens holder 1300 and the outer circumferential surface of the lens module 1400. The adhesive may be disposed between the outer circumferential surface of the lens module 1400 and the lens holder 1300. The second groove 1320 may comprise a chamfered surface 1321. The chamfered surface 1321 may be disposed at the lower end of the second groove 1320. The chamfered surface 1321 may obliquely connect the inner circumferential surface of the second groove 1320 and the lower surface of the lens holder 1300. The chamfered surface 1321 of the second groove 1320 may be obliquely disposed at a different inclination angle from the inner circumferential surface of the second groove 1320.

The second groove 1320 may comprise a plurality of grooves. The second groove 1320 may comprise four grooves. The second groove 1320 may comprise four grooves symmetrical with respect to the optical axis. The four grooves may be arranged on the inner circumferential surface of the lens holder 1300 so as to be spaced at equal intervals.

The lens holder 1300 may comprise a stepped portion 1330. The stepped portion 1330 may be formed on an outer circumferential surface of the lens holder 1300. The stepped portion 1330 may be formed at the lower end of the lens holder 1300. A lateral plate 1820 of the cover 1800 may be disposed at the stepped portion 1330. However, the stepped portion 1330 and the lateral plate 1820 of the cover 1800 may be spaced apart.

The lens holder 1300 may comprise a sidewall 1350. The side wall 1350 may form an outer circumferential surface of the lens holder 1300. The side wall 1350 may protrude from the upper surface of the lens holder 1300.

The lens holder 1300 may comprise an extension portion 1360. The extension portion 1360 may extend below the lower surface of the lens holder 1300. The extension portion 1360 may extend to the upper surface of the substrate 1100. However, the lower surface of the extension portion 1360 and the upper surface of the substrate 1100 may be spaced apart. The conductive member 1700 may be disposed on an outer surface of the extension portion 1360.

The lens holder 1300 may comprise a first groove 1370. The first groove 1370 may be formed on the side surface of the lens holder 1300. A first portion 1720 of the conductive member 1700 may be disposed in the first groove 1370. The first groove 1370 may be formed in a shape corresponding to the first portion 1720 of the conductive member 1700.

The lens holder 1300 may comprise a second groove 1380. The second groove 1380 may be formed on the upper surface of the lens holder 1300. A second portion 1730 of the conductive member 1700 may be disposed in the second groove 1380. The second groove 1380 may be formed in a shape corresponding to the second portion 1730 of the conductive member 1700.

The lens holder 1300 may comprise a third groove 1390. The third groove 1390 may be formed on the upper surface of the lens holder 1300. The third groove 1390 may be formed at each of four corners of the lens holder 1300. An adhesive may be disposed in the third groove 1390.

The camera device may comprise a lens module 1400. The lens module 1400 may be disposed in the lens holder 1300. The lens module 1400 may be disposed inside the lens holder 1300. The lens module 1400 may be coupled to the lens holder 1300.

The lens module 1400 may comprise a barrel 1410. The barrel 1410 may accommodate the lens therein. The inner circumferential surface of the barrel 1410 may be formed in a shape corresponding to the inner circumferential surface of the lens. The barrel 1410 may be formed of an insulating material.

The lens module 1400 may comprise a lens. The lens may be a solid lens. The lens may be a plastic lens. The lens may comprise a plurality of lenses. Some of the lenses may be disposed in a first group lens area 1420, and some of the lenses may be disposed in a second group lens area 1430. The first group lens area 1420 may be spaced apart from the second group lens area 1430. For example, three lenses may be disposed in the first group lens area 1420 and two lenses may be disposed in the second group lens area 1430.

The lens module 1400 may comprise a hole 1440. The hole 1440 may be a liquid lens accommodating portion. The liquid lens module 1500 may be disposed in the hole 1440. The hole 1440 may be formed to have a height higher than that of the liquid lens module 1500 by a predetermined size. In addition, the hole 1440 may penetrate the liquid lens module 1500 in the horizontal direction. Through this, the liquid lens module 1500 may be inserted into the hole 1440 of the lens module 1400 in the horizontal direction.

The lens module 1450 may comprise an adhesive hole 1450. The adhesive hole 1450 may be connected to the hole 1440. The adhesive hole 1450 may be formed to penetrate a portion of the upper plate of the barrel 1410 of the lens module 1450. An adhesive may be injected between the lens module 1450 and the liquid lens module 1500 through the adhesive hole 1450.

The camera device may comprise a liquid lens module 1500. The liquid lens module 1500 may be combined with the lens module 1400. The liquid lens module 1500 may be spaced apart from the lens holder 1300. The liquid lens module 1500 may be aligned with the lens and the image sensor 1110. The liquid lens module 1500 may be inserted into and fixed to the lens module 1400 in a horizontal direction.

The liquid lens module 1500 may comprise a liquid lens 1510. The liquid lens 510 may be disposed in a spacer 1520. The liquid lens 1510 may be disposed between the multiple lenses. The liquid lens 1510 may be disposed between the first group lens area 1420 and the second group lens area 1430.

The liquid lens 1510 whose focal length is adjusted in response to the driving voltage may receive an operating voltage through the electrode. The upper electrode may have the same angular distance and may comprise four individual terminals disposed at different directions. When an operating voltage is applied through the upper electrode and the lower electrode, the interface between the conductive liquid and the non-conductive liquid formed in the lens area may be deformed. The upper electrode may be an 'upper terminal'. The lower electrode may be a 'lower terminal'. The liquid lens 1510 may be spaced apart from the solid lens. In the second exemplary embodiment, an epoxy may be applied through a space separating the liquid lens 1510 and the solid lens, and active alignment of the liquid lens 1510 may be performed.

One side of the liquid lens 1510 may receive a voltage from the upper electrode. The other side of the liquid lens 1510 may receive a voltage from the lower electrode. The liquid lens 1510 may be described as an equivalent circuit as a capacitor between four individual electrodes and a common electrode. Here, the plurality of capacitors included in the equivalent circuit may have a small capacitance of about 200 pF level. In the second exemplary embodiment, the upper electrode of the liquid lens 1510 may be an individual terminal and the lower electrode may be a common terminal. Alternatively, the upper electrode of the liquid lens 1510 may be a common terminal and the lower electrode may be an individual terminal. The liquid lens 1510 may deform an interface formed between the conductive liquid and the non-conductive liquid by the current and/or voltage applied to the upper electrode and the lower electrode. In this way, any one or more of an AF function and an OIS function may be performed.

The liquid lens 1510 may comprise a terminal 1511. The terminal 1511 may comprise a plurality of terminals. The terminal 1511 may comprise four individual terminals formed at four corners of the upper surface of the liquid lens 1510, and four common terminals formed at four corners of the lower surface of the liquid lens 1510. The individual terminals may be individual electrodes. The common terminal may be a common electrode.

The liquid lens module 1500 may comprise a spacer 1520. The spacer 1520 may be a liquid lens spacer. The lower surface of the spacer 1520 may be disposed higher than the upper surface of the lens holder 1300. The liquid lens 1510 may be disposed inside the spacer 1520. The spacer 1520 may comprise a hole 1521. The hole 1521 may penetrate the spacer 1520 in the optical axis direction. The liquid lens 1510 may be disposed in the hole 1521.

The spacer 1520 may comprise a first groove 1522. The first groove 1522 may be formed on the upper surface of the spacer 1520. A portion of the upper terminal 1531 may be disposed in the first groove 1522. The first groove 1522 may be formed in a shape corresponding to a portion of the upper terminal 1531. The spacer 1520 may comprise a second groove 1523. The second groove 1523 may be formed on the side surface of the spacer 1520. A portion of the terminal 1530 may be disposed in the second groove 1523. The second groove 1523 may be formed in a shape corresponding to a portion of the terminal 1530. Spacer 1520 may comprise an adhesive groove. The adhesive groove of the spacer 1520 may be formed in any one or more of an upper surface and a lower surface of the spacer 1520. An adhesive may be disposed in the adhesive groove of the spacer 1520 so that the terminal 1530 may be fixed to the spacer 1520. The spacer 1520 may comprise a third groove 1524. The third groove 1524 may be formed on the lower surface of the spacer 1520. The third groove 1524 may be formed in a shape corresponding to the second lower terminal 1532-2.

The third groove 1524 may comprise an adhesive groove. An adhesive may be applied to at least a portion of the third groove 1524.

The liquid lens module 1500 may comprise a terminal 1530. The terminal 1530 may be disposed on the side surface of the liquid lens module 1500. The terminal 1530 may be disposed in the spacer 1520. The terminal 1530 may be coupled to the spacer 1520. At least a portion of the terminal 1530 may be disposed on an outer surface of the spacer 1520. The terminal 1530 may be electrically connected to the liquid lens 1510. The terminal 1530 may be connected to the liquid lens 1510. The terminal 1530 may be connected to the terminal 1511 of the liquid lens 1510.

Terminal 1530 may comprise: a first terminal disposed on a first side surface of the spacer 1520; and a second terminal disposed on a second side surface opposite the first side surface of the spacer 1520. At this time, the elastic contact portion 1710 of the conductive member 1700 may press each of the first terminal and the second terminal inward. The contact spring of the conductive member 1700 may press each of the first terminal and the second terminal inward. Through this, the liquid lens module 1500 may be fixed because it is pressed from both sides.

The terminal 1530 may comprise a plurality of terminals. The terminal 1530 may comprise five terminals. At this time, three of the five terminals are disposed on the first side surface of the liquid lens module 1500, and the remaining two terminals of the five terminals may be disposed on the second side surface opposite to the first side surface of the liquid lens module 1500. At this time, the conductive member 1700 may comprise five conductive members 1700 corresponding to the five terminals.

The plurality of terminals may comprise: four upper terminals 1531 disposed on the upper surface of the spacer 1520 and the outer surface of the spacer 1520 and connected to individual terminals of the liquid lens 1510; and a lower terminal 1532 disposed on the lower surface of the spacer 1420 and the outer surface of the spacer 1420 and connected to the common terminal of the liquid lens 1510.

The terminal 1530 may comprise an upper terminal 1531. The upper terminal 1531 may comprise a plurality of terminals. The upper terminal 1531 may comprise four terminals. The four terminals of the upper terminal 1531 may be connected to four individual terminals of the liquid lens 1510, respectively. The upper terminal 1531 may comprise 1-1 to 1-4 terminals 1531-1, 1531-2, 1531-3, and 1531-4. The 1-1 and 1-2 terminals 1531-1, 1531-2 are disposed at one side of the spacer 1520, and the 1-1 and 1-4 terminals 1531-3, 1531-4 may be disposed on the other side of the spacer 1520.

Upper terminal 1531 may comprise: a body portion 1531c disposed on the upper surface of the spacer 1520; a first coupling portion 1531a extending from the body portion 1531c and connected to the individual terminal of the liquid lens 1510; a second coupling portion 1531b extending from the body portion 1531c and disposed on an outer surface of the spacer 1520 and connected to the conductive member 1700; and an extension portion 1531d extending from the body portion 1531c and inserted into the groove of the spacer 1520 is provided. The spacer 1520 may comprise a groove formed in the upper surface of the spacer 1520. At this time, the extension portion 1531d may be inserted into and fixed to the groove of the spacer 1520. The extension portion 1531d may be in the shape of a hook. The upper terminal 1531 may comprise: a first coupling portion 1531a connected to the terminal 1511 of the liquid lens 1510; a second coupling portion 1531b connected to the conductive member 1700; and a body portion 1531c connecting the first coupling portion 1531a and the second coupling portion 1531b. The body portion 1531c may be a connecting portion. The upper terminal of the first coupling portion 1531a is disposed on the upper surface of the spacer 1520, the body portion 1531c is disposed on the upper surface of the spacer 1520, and the second coupling portion 1531b may be disposed on an outer surface of the spacer 1520. The body portion 1531c may form a right angle with the second coupling portion 1531b. The body portion 1531c of the upper terminal 1531 may comprise: a first end portion 1531f disposed inside the outer circumferential surface of the spacer 1520; and a second end portion 1531g more protruding than the outer circumferential surface of the spacer 1520. Since the surface of the spacer 1520, which is an injection mold product, and the terminal 1530, which is a metal, are not bonded to each other, the metal may be separated from the injection mold product by an external force therefore the extension portion 1531d may be a structure embedded in the injection mold product as a hook type. When the outer line of metal whose surface is intentionally exposed coincides with the outer line of the mold, injection flashes (burrs) may occur, and thus, the first end portion 1531f of the body portion 1531c may be to overlap or underlap with respect to the mold line. At this time, 'underlap' may mean the opposite of 'overlap'.

The terminal 1530 may comprise a lower terminal 1532. The lower terminal 1532 may be disposed on the lower surface and the outer surface of the spacer 1520. The lower terminal 1532 may connect four common terminals of the liquid lens 1510. In the second exemplary embodiment, the lower terminal 1532 can be used to remove the bridge and use it as an electrode connecting terminal.

The lower terminal 1532 may comprise: a first lower terminal 1532-1 disposed on the lower surface and/or the upper surface of the spacer 1520 and the outer side surface of the spacer 1520; and a second lower terminal 1532-2 having the shape of a plate and coupled to the lower surface of the spacer 1520 and connecting the common terminal of the liquid lens 1510 and the first lower terminal 1532-1.

The first lower terminal 1532-1 may comprise: a third coupling portion 1532d disposed on the lower surface of the spacer 1520 and connected to the second lower terminal 1532-2: a fourth coupling portion 1532e extending from the third coupling portion 1532d and disposed on an outer surface of the spacer 1520 and connected to the conductive member 1700; and an extension portion 1532f extending from the third coupling portion 1532d and inserted into the hole of the spacer 1520. The spacer 1520 may comprise holes penetrating from the lower surface of the spacer 1520 to the upper surface of the spacer 1520. At this time, the extension portion 1532f may be inserted into the hole of the spacer 1520 and fixed thereto. The extension portion 1532f may be in the shape of a hook.

The second lower terminal 1532-2 may comprise: a first coupling portion 1532a connected to the terminal 1511 of the liquid lens 1510; a second coupling portion 1532b connected to the upper terminal 1531; and a connecting portion 1532c connecting the first coupling portion 1532a and the second coupling portion 1532b.

In the liquid lens 1510, a semi-circular shape or a spherical curvature such as a lens may be formed in a state in which two kinds of liquids are not mixed together. Four or more exposed terminals 1511 may be formed on the outer side of the liquid lens 1510 to control the interface surface curvature. The first coupling portion 1531a for connecting the upper terminal of the liquid lens 1510 may be formed inside in a plane. It may be terminal coupled up to the side surface in order to connect the first coupling portion 1531*a*, which are separately formed in a plane, to the external electrodes. The first coupling portion 1531*a*, through which the liquid lens 1510 at the inner side is electrically conducted, and the second coupling portion 1531*b* for external electrical conduction are connected to each other and may have a bent shape therein. The spacer 1520, which is an injection molded product, may be provided for fixing the liquid lens 1510 and the terminal 1530, respectively, and for fixing the liquid lens 1510 and the terminal 1530. The spacer 1520 is structurally wrapped by the upper terminal 1531, and a space for applying an electrically conductive bond may be formed around the first coupling portion 1531*a* portion. A second lower terminal 1532-2, which is a metal terminal, may be provided for electrically conducting the lower terminal of the liquid lens 1510. The second lower terminal 1532-2 may be assembled to the lower side of the spacer 1520, which is an injection molded product, bonded to each other, and a conductive bond may be applied to a space formed in the planar electrode portion to electrically couple the liquid lens 1510. 제In order to connect the second lower terminal 1532-2 to the external electrode, a first lower terminal 1532-1 having a side surface and a lower side exposed in red may be provided in the spacer 1520. A space is formed in a portion of the second lower terminal 1532-2 that faces the first lower terminal 1532-1 in a plane, and the second lower terminal 1523-2 and the first lower terminal 1532-1 may be electrically connected.

Through the structure of the liquid lens module 1500 of the second exemplary embodiment, it is possible to simplify the process and reduce the investment cost by reducing the number of components. In addition, it is possible to reduce the material cost by reducing the number of components. Component integration allows compact height implementations. The strength of the terminal can be improved compared to the prior art. The electrode connection with the outside can be formed on the side surface without forming an electrical connecting portion separately. Therefore, size reduction in the planar direction may become possible.

Referring to FIG. 36, the liquid lens module 1500 according to the second exemplary embodiment may be assembled through the following procedure. First, the spacer 1520 in a state where the upper terminal 1531 and the first lower terminal 1532-1 are coupled is prepared in a flipped state. While the spacer 1520 is in a flipped state, the liquid lens 1510 coupled to the spacer 1520 may be disposed such that the size of the upper opening is smaller than that of the lower opening. Thereafter, a conductive adhesive is applied to the first coupling portion 1531*a* of the upper terminal 1531, and the liquid lens 1510 is also inserted and coupled in a flipped state. At this time, the first coupling portion 1531*a* of the upper terminal 1531 and the terminal of the upper surface of the liquid lens 1510 are electrically connected. Thereafter, the second lower terminal 1532-2 is coupled to the spacer 1520 and the liquid lens 1510. The terminal of the lower surface of the liquid lens 1510 and the second lower terminal 1532-2 may be electrically connected by a conductive adhesive. In addition, in this process, the first lower terminal 1532-1 and the second lower terminal 1532-2 may be electrically connected at the same time. Through the aforementioned process, the assembly of the liquid lens module 1500 may be completed.

Referring to FIG. 37, an electrode is formed on the side surface of the assembled liquid lens module 1500, and the liquid lens module 1500 is assembled in a plane direction (horizontal direction) to the lens module 1400 which is an injection molded product. After optically aligning the lens module 1400 and the liquid lens module 1500 comprising the lens, a fixing bond is applied to the adhesive hole 1450 formed on the upper side to assemble the lens module 1400 and the liquid lens module 1500. Subsequently, the liquid lens module 1500 and the assembly of the lens module 1400 are inserted into the vertically protruding contact spring maintaining the elastic force in the vertical direction to conduct electricity. Thereafter, the bond is applied to the bond application groove and the space (bond tank) formed under the lens holder 1300 and cured to fix the lens module 1400 to the lens holder 1300. Thereafter, the assembly of the camera device may be completed by assembling the cover 1800 which is a metal cover in an upward direction.

The camera device may comprise a conductive member 1700. A conductive member 1700 may be disposed in the lens holder 1300. The conductive member 1700 may electrically connect the substrate 1100 and the liquid lens module 1500. The conductive member 1700 may be integrally formed.

The conductive member 1700 may comprise a plurality of conductive members 1700. The conductive member 1700 may comprise five conductive members. The conductive member 1700 may comprise first to fifth conductive members 1700-1, 700-2, 700-3, 700-4, and 700-5. The five conductive members may be electrically connected to five first terminals, respectively. Here, five first terminals may comprise four upper terminals and one common terminal.

The conductive member 1700 may comprise an elastic contact portion 1710. The elastic contact portion 1710 may have elasticity. The elastic contact portion 1710 may directly contact the terminal 1530 of the liquid lens module 1500. Through this, the elastic portion 1710 and the liquid lens module 1500 may be electrically conducted without any additional work such as soldering. The elastic contact unit 1710 may be a contact spring that elastically presses the terminal 1530 of the liquid lens module 1500 to maintain contact with the terminal 1530 of the liquid lens module 1500. The contact spring may press both side surfaces of the liquid lens module 1500. The contact spring may press the spacer 1520 inwardly from both sides. Through this, the fixing force may be provided to the liquid lens module 1500. The elastic contact portion 1710 may be bent to form an obtuse angle with the second portion 1730. The elastic contact portion 1710 may be bent at an obtuse angle that is less than a right angle from the second portion 1730. As the second exemplary embodiment, the elastic contact portion 1710 has been described as being a contact spring, however, in a modified example, the entire conductive member 1700 may be formed of a contact spring. The contact spring may be elastic at least in part.

The elastic contact portion 1710 may comprise a third portion 1710-1 and a fourth portion 1710-2. The third portion 1710-1 may be connected to the inner side end portion of the second portion 1730. The third portion 1710-1 may connect the second portion 1730 and the fourth portion 1710-2. The third portion 1710-1 may be bent or bent from the second portion 1730. The fourth portion 1710-2 may be connected to the inner side end portion of the third portion 1710-1. An end of the fourth portion 1710-2 may be formed as a free end. The fourth portion 1710-2 may be bent or bent from the third portion 1710-1. The fourth portion 1710-2 may form a right angle with the third portion 1710-1. Alternatively, the fourth portion 1710-2 may form an acute angle with the third portion 1710-1. Alternatively, the fourth portion 1710-2 may form an obtuse angle with the third portion 1710-1.

The conductive member 1700 may comprise a first portion 1720 and a second portion 1730. The first portion 1720 may be disposed on the side surface of the lens holder 1300. The lower end of the first portion 1720 may be connected to the terminal of the substrate 1100. The second portion 1730 may be disposed on the upper surface of the lens holder 1300. The second portion may connect an upper end of the first portion 1720 and an upper end of the elastic contact portion 1710. The second portion 1730 may be bent to form a right angle with the first portion 1720. The first portion 1720 of the conductive member 1700 may be disposed in the first groove 1370 of the lens holder 1300. The second portion 1730 of the conductive member 1700 may be disposed in the second groove 1380 of the lens holder 1300. The first portion 1720 and the second portion 1730 may be spaced apart from the cover 1800.

The camera device may comprise a cover 1800. The cover 1800 may cover the lens holder 1300. The cover 1800 may be combined with the base 1200. The cover 1800 can accommodate the lens holder 1300 therein. The cover 1800 may form an outer appearance of the camera device. The cover 1800 may have a hexahedron shape with the lower surface open. The cover 1800 may be nonmagnetic material. The cover 1800 may be formed of a metal material. The cover 1800 may be formed of a metal plate. The cover 1800 may be connected to the ground portion of the substrate 1100. Through this, the cover 1800 may be grounded. The cover 1800 may shield electromagnetic interference (EMI). In this case, the cover 1800 may be referred to as an 'EMI shield can'.

The cover 1800 may comprise an upper plate 1810 and a lateral plate 1820. The cover 1800 may comprise an upper plate 1810 and a lateral plate 1820 extending downward from the upper plate 1810.

Although exemplary embodiments of the present invention have been described above with reference to the accompanying drawings, it may be understood that those skilled in the art to which the present invention belongs may implement the present invention in other specific forms without changing the technical spirit or essential features thereof. Therefore, it should be understood that the exemplary embodiments described above are exemplary in all respects and not restrictive.

The invention claimed is:

1. A camera device comprising:
a substrate;
an image sensor disposed on the substrate;
a base disposed above the substrate;
a lens holder disposed above the base;
a lens module disposed on the lens holder;
a liquid lens module coupled with the lens module; and
an adhesive coupling the lens holder and the base,
wherein the lens holder comprises a groove formed between the base and the liquid lens module, and
wherein the groove is formed from a lower area of the lens holder.

2. The camera device of claim 1, comprising a conductive member electrically connecting the liquid lens module and the substrate.

3. The camera device of claim 1, wherein the groove is formed from the lower area of the lens holder to an area adjacent to the liquid lens module.

4. The camera device of claim 3, wherein the lower area of the lens holder is an upper area of the base.

5. The camera device of claim 1, wherein the groove forms a gas discharge path connecting an upper surface of the base to a lower surface of the liquid lens module.

6. The camera device of claim 1, wherein the groove forms a path through which a gas escapes.

7. The camera device of claim 1, wherein the groove extends along an optical axis direction.

8. The camera device of claim 1, wherein both distal ends of the groove are opened with respect to an optical axis direction.

9. The camera device of claim 1, wherein the groove forms a path between the lens holder and the lens module so that a gas generated during curing of the adhesive is discharged toward the liquid lens module.

10. The camera device of claim 1, wherein the groove of the lens holder forms a gap between the lens holder and the lens module.

11. An optical apparatus comprising:
a main body;
the camera module of claim 1 disposed on the main body; and
a display disposed on the main body and outputting an image photographed by the camera module.

12. A camera device comprising:
a base;
a lens holder disposed on the base;
a lens module coupled to the lens holder;
a liquid lens module coupled to the lens module; and
an adhesive coupling the lens holder and the base,
wherein the lens holder comprises a recess, and
wherein a gas discharge path is formed between the base and the liquid lens module by the recess of the lens holder so that a gas is discharged toward outside.

13. The camera device of claim 12, wherein the gas is generated by the adhesive.

14. The camera device of claim 12, wherein the lens holder comprises a groove formed from a lower surface of the lens holder, and
wherein an adhesive is disposed in the groove of the lens holder so that the lens holder and the lens module are coupled.

15. The camera device of claim 14, wherein the groove of the lens holder comprises four grooves symmetrical about an optical axis,
wherein the recess comprises two recesses symmetrical with respect to the optical axis, and
wherein the two recesses are spaced apart from the four grooves.

16. The camera device of claim 12, wherein the adhesive is disposed between an upper surface of the base and the lens holder and between a lateral surface of the base and the lens holder.

17. The camera device of claim 12, wherein the groove of the lens holder forms a gap between an inner peripheral surface of the lens holder and an outer peripheral surface of the lens module.

18. The camera device of claim 12, comprising a cover comprising an upper plate comprising a hole, and a lateral plate extending downward from the upper plate,
wherein a gas discharge path is formed between the lens module and the hole of the cover through a lower surface of the liquid lens module, a lateral surface of the liquid lens module, and an upper surface of the liquid lens module.

19. The camera device of claim 18, wherein a first space is formed by the base, the lens holder and the lens module, wherein a second space is formed by the liquid lens module, the lens holder and the lens module, and wherein a path is formed in order of the first space, the second space, a lateral space of the liquid lens module, the upper space of the liquid lens module, and the hole of the cover.

20. A camera device comprising:

a substrate;

an image sensor disposed on the substrate;

a base disposed on the substrate;

a lens holder disposed on the base;

a lens module disposed in the lens holder;

a liquid lens module coupled to the lens module;

an adhesive for coupling the lens holder and the base; and a conductive member electrically connecting the liquid lens module and the substrate, wherein a first space is formed between the base, the lens holder, and the lens module, wherein a second space is formed between the liquid lens module, the lens module, and the lens holder, and wherein the lens holder comprises a groove connecting the first space and the second space.

* * * * *